(12) United States Patent
McCormack et al.

(10) Patent No.: US 7,720,887 B2
(45) Date of Patent: May 18, 2010

(54) DATABASE NAVIGATION

(75) Inventors: Michael J McCormack, Snohomish, WA (US); Andrew R. Miller, Issaquah, WA (US); Christopher W. Bryant, Seattle, WA (US); Jonathan M Sigler, Medina, WA (US); Robert E Coggins, Bellevue, WA (US); Scott T. Gardner, Seattle, WA (US); Theresa A Naramore, Snohomish, WA (US); Daniel Hough, Seattle, WA (US); Kelly M Krout, Redmond, WA (US); Clinton D Covington, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 411 days.

(21) Appl. No.: 11/027,502

(22) Filed: Dec. 30, 2004

(65) Prior Publication Data

US 2006/0149769 A1    Jul. 6, 2006

(51) Int. Cl.
  *G06F 7/00*   (2006.01)
  *G06F 3/048*  (2006.01)
(52) U.S. Cl. ...................... 707/805; 715/810
(58) Field of Classification Search ................. 707/103, 707/101; 715/810
   See application file for complete search history.

(56) References Cited

U.S. PATENT DOCUMENTS

| | | | |
|---|---|---|---|
| 5,181,162 A * | 1/1993 | Smith et al. ................. 715/530 |
| 5,414,812 A * | 5/1995 | Filip et al. ............... 707/103 R |
| 5,425,140 A | 6/1995 | Bloomfield et al. |
| 5,487,141 A * | 1/1996 | Cain et al. .................. 715/764 |
| 5,491,795 A | 2/1996 | Beaudet et al. |
| 5,500,936 A | 3/1996 | Allen et al. |
| 5,535,389 A * | 7/1996 | Elder et al. ................. 717/170 |
| 5,651,108 A * | 7/1997 | Cain et al. .................. 715/763 |
| 5,790,122 A | 8/1998 | Cecchini et al. |
| 5,857,197 A * | 1/1999 | Mullins .................. 707/103 R |
| 5,914,716 A | 6/1999 | Rubin et al. |
| 5,940,078 A | 8/1999 | Nagarajayya et al. |
| 6,014,138 A * | 1/2000 | Cain et al. .................. 715/826 |
| 6,075,537 A | 6/2000 | Adapathya et al. |
| 6,091,415 A | 7/2000 | Chang et al. |
| 6,147,683 A | 11/2000 | Martinez et al. |
| 6,154,750 A | 11/2000 | Roberge et al. |
| 6,229,539 B1 | 5/2001 | Morcos et al. |
| 6,467,081 B2 | 10/2002 | Vaidyanathan et al. |
| 6,801,916 B2 | 10/2004 | Roberge et al. |

(Continued)

*Primary Examiner*—John E Breene
*Assistant Examiner*—Joshua Bullock
(74) *Attorney, Agent, or Firm*—Lee & Hayes, PLLC

(57) ABSTRACT

Database interaction is facilitated by graphically presenting database objects in groups that are not necessarily dictated by object types of the database objects. In an example implementation, database navigation is facilitated by determining object dependency groups for a database in which each object dependency group corresponds to a database source object and includes at least those database objects that depend directly or indirectly from the corresponding database source object. When these data source object-based dependency groups are graphically displayed, selecting a database object thereof provides access thereto. In another example implementation, a user can designate an attribute associated with database objects by which the database objects are to be grouped. Thus, the database objects are grouped by various values that the user-designated associated attribute takes. These designated-attribute-based value-driven groups may also be graphically displayed to enable navigation of and access to the different database objects assigned to them.

15 Claims, 18 Drawing Sheets

U.S. PATENT DOCUMENTS

| | | |
|---|---|---|
| 6,828,729 B1 | 12/2004 | Owens et al. |
| 6,829,615 B2 | 12/2004 | Goodwin et al. |
| 7,017,122 B1 | 3/2006 | Lee et al. |
| 7,164,410 B2 | 1/2007 | Kupka |
| 7,254,581 B2 | 8/2007 | Johnson et al. |
| 7,278,092 B2 | 10/2007 | Krzanowski |
| 7,305,436 B2 | 12/2007 | Willis |
| 2002/0103789 A1 | 8/2002 | Turnbull et al. |
| 2003/0035012 A1 | 2/2003 | Kurtenbach et al. |
| 2004/0003096 A1 | 1/2004 | Willis |
| 2004/0070622 A1 | 4/2004 | Cossey et al. |
| 2005/0022132 A1 | 1/2005 | Herzberg et al. |
| 2005/0091609 A1 | 4/2005 | Matthews et al. |
| 2005/0091641 A1 | 4/2005 | Starbuck et al. |
| 2005/0154986 A1 | 7/2005 | Bartek et al. |
| 2005/0154989 A1 | 7/2005 | Maddocks et al. |
| 2005/0223022 A1 | 10/2005 | Weissman et al. |
| 2005/0251754 A1 | 11/2005 | Padgett et al. |
| 2006/0085766 A1 | 4/2006 | Dominowska et al. |

\* cited by examiner

OBJECT DEPENDENCIES

INTRINSIC
ATTRIBUTE

OBJECTS
WITH
ASSOCIATED
ATTRIBUTES

IMPUTED
ATTRIBUTE

NAVIGATION PANE
FOOTER
DROP DOWN MENU

GROUP BY SUBMENU

1504

NAVIGATION PANE
FOOTER
DROP DOWN MENU

SORT BY SUBMENU

1506

NAVIGATION PANE
FOOTER
DROP DOWN MENU

VIEW BY SUBMENU

1508

DATABASE NAVIGATION

TECHNICAL FIELD

This disclosure relates in general to interacting with databases and in particular, by way of example but not limitation, to database navigation using a navigation map that is organized by object dependencies.

BACKGROUND

Databases are used by businesses, individuals, educational institutions, etc. to store data for subsequent accessing and/or manipulation. A database may be considered an amalgamation of data that is arranged for ease and speed of search and retrieval. Databases are usually associated with a program to enter, update, query, retrieve, etc. the data of the databases.

Generally, databases can be divided into data sources, data consumers, actionables, and so forth. More specifically, each database may have one or more large structured sets of persistent data. These structured sets of persistent data are usually termed data sources. A data source is thus a type of object for a database. Data consumers are other types of database objects; examples of data consumers are data processing objects, data formatting objects, data input objects, and so forth. Data sources actually store the data of a given database, and the data consuming object types provide some kind of view on or of the stored data.

Example descriptions of four of the above-mentioned database object types are provided below. First, data sources are sets of like data that can be described by one schema. More specifically, a data source is usually a set of similar records. Second, data processing objects represent a search on stored data. More specifically, a data processing object is usually a set of rules for retrieving data from one or more data sources. Third, data formatting objects present data from a data source or a data processing object in a formatted fashion. More specifically, a data formatting object is usually a set of rules for formatting retrieved data. Fourth, data input objects provide a simplified mechanism for inputting data into at least one data source. More specifically, a data input object is usually a document or similar displayable file that provides a relatively quick and easy mechanism to modify and/or insert records into a database using an intuitive, graphical environment. Data input objects can also be used to filter and/or view data of a database.

Some desktop database programs with integrated user interface (UI) packages enable a user to access any of the four types of database objects identified above. A user first decides which type of object is desired. Secondly, the user selects this desired object type from a menu or similar input interface mechanism. Thirdly, the user is empowered to access an object of the selected type. Unfortunately, this scheme is not particularly intuitive or helpful from a usability perspective. For example, if a user is trying to find a particular data formatting object in a data formatting object section of the database program, the user must intrinsically know and personally remember which data formatting object pertains to the data subject matter of interest.

Accordingly, there is a need for schemes, mechanisms, techniques, etc. that can facilitate database interaction by providing a user some level of data subject matter context for objects of a database.

SUMMARY

Database interaction is facilitated by graphically presenting database objects in groups that are not necessarily dictated by object types of the database objects. In an example implementation, database navigation is facilitated by determining object dependency groups for a database in which each object dependency group corresponds to a database source object and includes at least those database objects that depend directly or indirectly from the corresponding database source object. When these data source object-based dependency groups are graphically displayed, selecting a dependent database object thereof provides access thereto.

Other method, system, approach, apparatus, device, media, procedure, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction

The description herein is directed to interactions with databases. In an initial section herein below entitled "Introduction to Databases", examples of common database object types are briefly described with particular reference to FIG. 1. Also, an example of a GUI screenshot of a database program for interacting with databases, including navigating through multiple database objects and accessing individual ones thereof, is described in this initial section with particular reference to FIG. 2.

In a subsequent section entitled "Object Dependency", database navigation with regard to object dependency is described with particular reference to FIGS. 3-6. In a section thereafter entitled "Custom Grouping", database interaction with regard to objects grouped by a user-designated attribute is described with particular reference to FIGS. 7A-11. Finally, in a section entitled "Navigation Pane Features", general features of a specific example of a navigation pane for a database program are described with particular reference to FIGS. 12-15D.

Introduction to Databases

Figure 1:
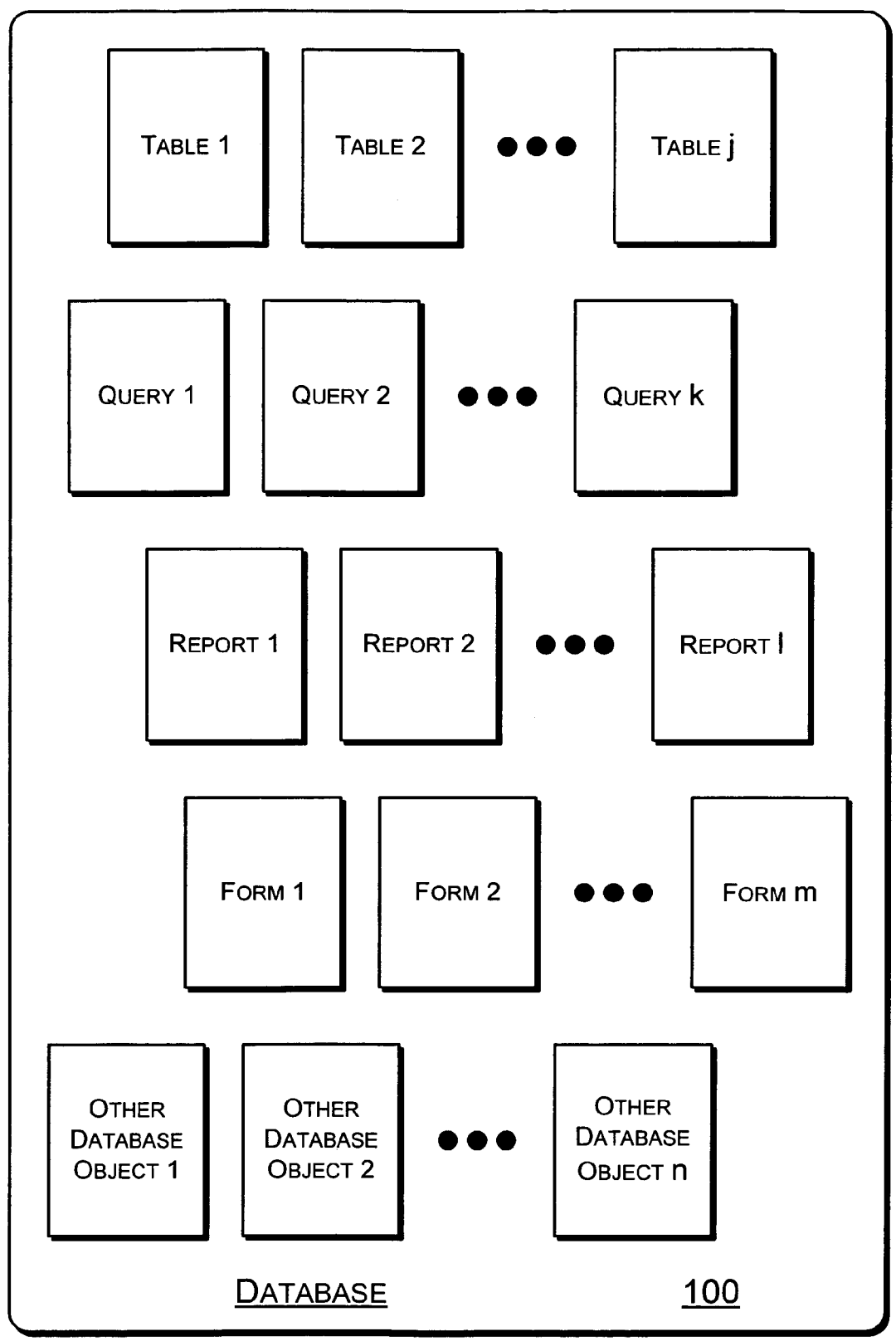
FIG. 1 is a block diagram example of a general desktop database that is associated with a desktop database program having an integrated user interface (UI).

FIG. 1 is a block diagram example of a general desktop database 100 that is associated with a desktop database program having an integrated user interface (UI). However, the description herein is applicable to databases generally. Database 100 illustrates multiple different types of database objects. These database objects include tables, queries, reports, forms, and other database objects. Databases generally include one or more tables. General databases can also include any number of queries, reports, forms, and other database objects. In a described implementation however, example database 100 includes "j" tables. Example database 100 also includes "k" queries, "l" reports, "m" forms, and "n" other database objects. The variables j, k, l, m, and n may be integers of zero or greater.

As illustrated, database 100 includes: table 1, table 2 . . . table j; query 1, query 2 . . . query k; report 1, report 2 . . . report 1; form 1, form 2 . . . form m; and other database object 1, other database object 2 . . . other database object n. As described herein above, tables store the data of database 100. The query, report, and form objects provide some view on or some view of at least one table object. The "n" other database objects represent other possible objects (i) that provide some view on or of at least one table of database 100 or (ii) that provide and/or cause some action to occur with respect to database 100. Examples of action-oriented database objects, or actionables, include macros, modules, action queries, scrips, and so forth. Actionables are capable of manipulating or otherwise interacting with data and/or objects without necessarily displaying the data to a user.

To summarize, database objects can be divided into at least data source objects and data consuming objects. Data consuming objects can be further divided into at least view objects and database action objects. Database action objects or actionables manipulate or otherwise interact with the data or other database objects of a database. Examples of action objects include macros, modules, action queries, scrips, and so forth. View objects can be further divided into data processing objects, data formatting objects, data input objects, and so forth.

In this document, an example of a data source object is a table. Similarly, an example of a data processing object is a query, an example of a data formatting object is a report, and an example of a data input object is a form. Although the terms table, query, report, form, etc. are used herein when describing certain implementations, it should be understood that the described implementations are applicable to database objects generally.

Although database 100 includes this great diversity of objects as well as an immense wealth of information, it is only truly useful if (and to the extent that) a user can gain access to the information. A database program (not separately pictured in FIG. 1) provides this access. Hence, the better that a database program provides access to the underlying database 100, the more useful database 100 can be to a user. Various database interfaces and interaction schemes, mechanisms, and techniques are described herein, including multiple GUIs.

Figure 2:
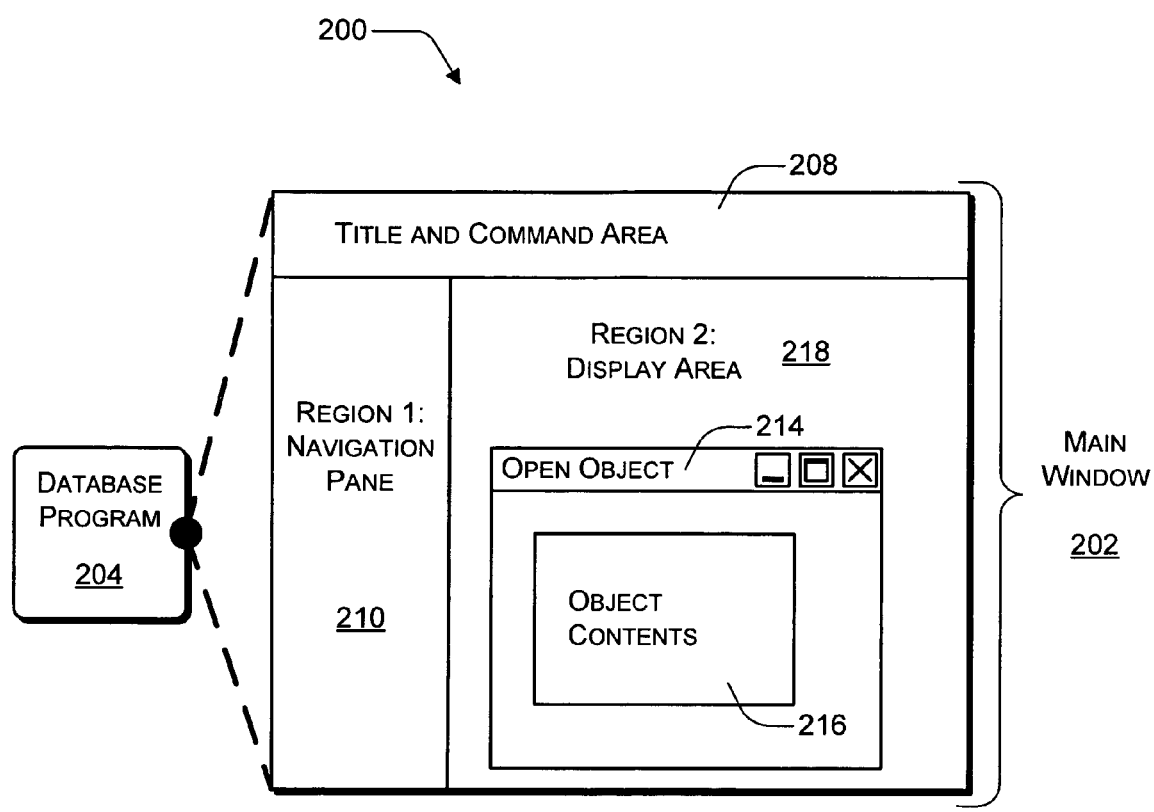
FIG. 2 is an example of a general screenshot for a database program having a graphical user interface (GUI) capability.

FIG. 2 is an example of a general screenshot 200 for a database program 204 having a GUI capability. Database program 204, as represented by its main window 202, is illustrated in a navigational or other mode in which an object can be accessed. Main window 202 includes a title and command area 208, a first region 210, and a second region 218. However, main window 202 may alternatively have different regions and areas and/or may otherwise be laid out (e.g., arranged) differently.

Title and command area 208, as illustrated, is located at a top portion or pane of main window 202. Although the accompanying figures and the description herein that references them may illustrate and pertain to specific implementations (e.g., in which an area or region is represented specifically as a pane, a sub-window, or a separate window), it should be understood that graphical areas or regions can be alternatively implemented as a different one or more of a pane, a sub-window, a separate window, and so forth.

In the illustrated navigation or other object-accessing mode, main window 202 of database program 204 includes a first region 210 (e.g., a pane or sub-window of main window 202) that is devoted to a listing of database objects that are currently eligible for accessing. Once a database object has been selected (e.g., focused on or highlighted with a mouse single-click, a maneuvering of a highlight indicator, etc.) within navigation pane 210, the selected database object can be directly activated (e.g., by double-clicking thereon, pressing "Enter", etc.). Alternatively, database objects can be accessed by keyboarding, by a keyboard combination, by keyboard and mouse combinations, or by another input mechanism (e.g., a menu-based or other action button or keyboard combination as well as by other input devices). Also, multiple database objects may be simultaneously selected and activated and/or otherwise manipulated (e.g., dragged and dropped). Additional example input mechanisms are described herein below, especially in the section entitled "Navigation Pane Features".

Activation of a selected database object enables access to the database object. For example, all or a portion of the accessed database object may be displayed within second region 218 (e.g., another pane or sub-window) of main window 202 that is devoted to displaying objects. As illustrated, an opened database object is displayed within display area 218 in a sub-window 214 that is entitled "Open Object". Within the "Open Object" sub-window 214, object contents 216 of the accessed database object are displayed. Although accessing a database object is described in detail above with regard to (i) focusing on or highlighting it and (ii) activating it, database object accessing can be described generically in terms of selecting the database object.

Object Dependency

Figure 3:
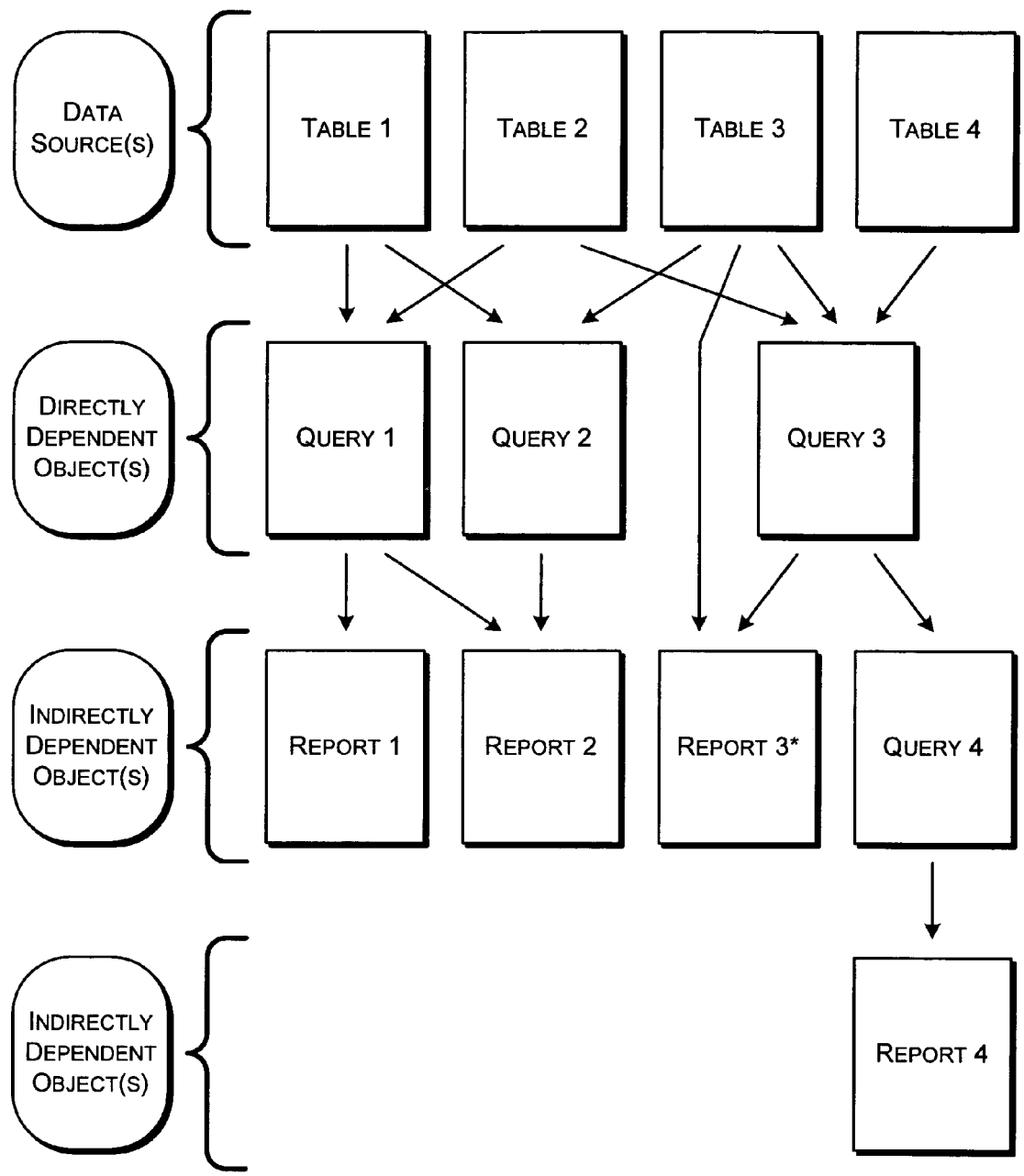
FIG. 3 is an example of inter-object dependencies with multiple levels of dependency.

FIG. 3 is an example of inter-object dependencies with multiple levels of dependency. Example database 300 includes four (4) tables, four (4) queries, and four (4) reports. The tables are considered data sources within database 300. Queries and reports (as well as forms and other view objects, if any) are considered dependent objects because they provide some view on or of the data stored by the tables. Dependencies in database 300 are indicated by the arrows. For example, query 1 is dependent on table 1 and table 2.

A single level of dependency is termed direct dependency, and two or more levels of dependency is termed indirect dependency. Queries 1, 2, and 3 are directly dependent on one or more tables. Reports 1, 2, and 3 and query 4 are indirectly dependent on one or more tables. Report 3, as indicated by the asterisk (*), is also directly dependent on table 3. Report 4 is indirectly dependent on one or more tables.

Queries 1, 2, and 3 have or are associated with a first level of dependency. Reports 1, 2, and 3 and query 4 have a second level of dependency. Report 4 has a third level of dependency. The first level of dependency thus corresponds to direct dependence. The second, third, and greater levels of dependency thus correspond to indirect dependence. There can be any number of levels of indirect dependency.

By way of example, the dependencies of several dependent objects are described here. Query 1 is directly dependent on tables 1 and 2. Report 1 is indirectly dependent on tables 1 and 2 by way of query 1. Query 2 is directly dependent on tables 1 and 3. Report 2 is indirectly dependent on tables 1, 2, and 3 by way of queries 1 and 2. Query 3 is directly dependent on tables 2, 3, and 4. Report 3 is directly dependent on table 3 and indirectly dependent on tables 2, 3, and 4 by way of query 3. Report 4 is indirectly dependent on tables 2, 3, and 4 by way of query 4 and query 3.

In a real world sense, people tend to contemplate and to analyze their data in terms of the origin data source(s) or table(s). Hence, a user's benefit from and experience with a database can be improved if access to individual ones of its various objects can be provided with regard to the origin data source(s) or table(s) thereof. To this end, the view objects of database 300 are organized into groups with respect to the tables 1, 2, 3, and 4 from which they depend. These organized groups are described herein below with particular reference to FIG. 4.

Although only four different database object types are shown in FIG. 3, object dependency is applicable to databases regardless of the numbers of different database object types or the levels of dependencies. Also, it should be noted that there need not be a one-to-one correspondence between the different database object types (e.g., a database can have 2 tables, 4 queries, and 3 reports). Moreover, database objects can be unrelated to and independent of any data source object.

Figure 4:
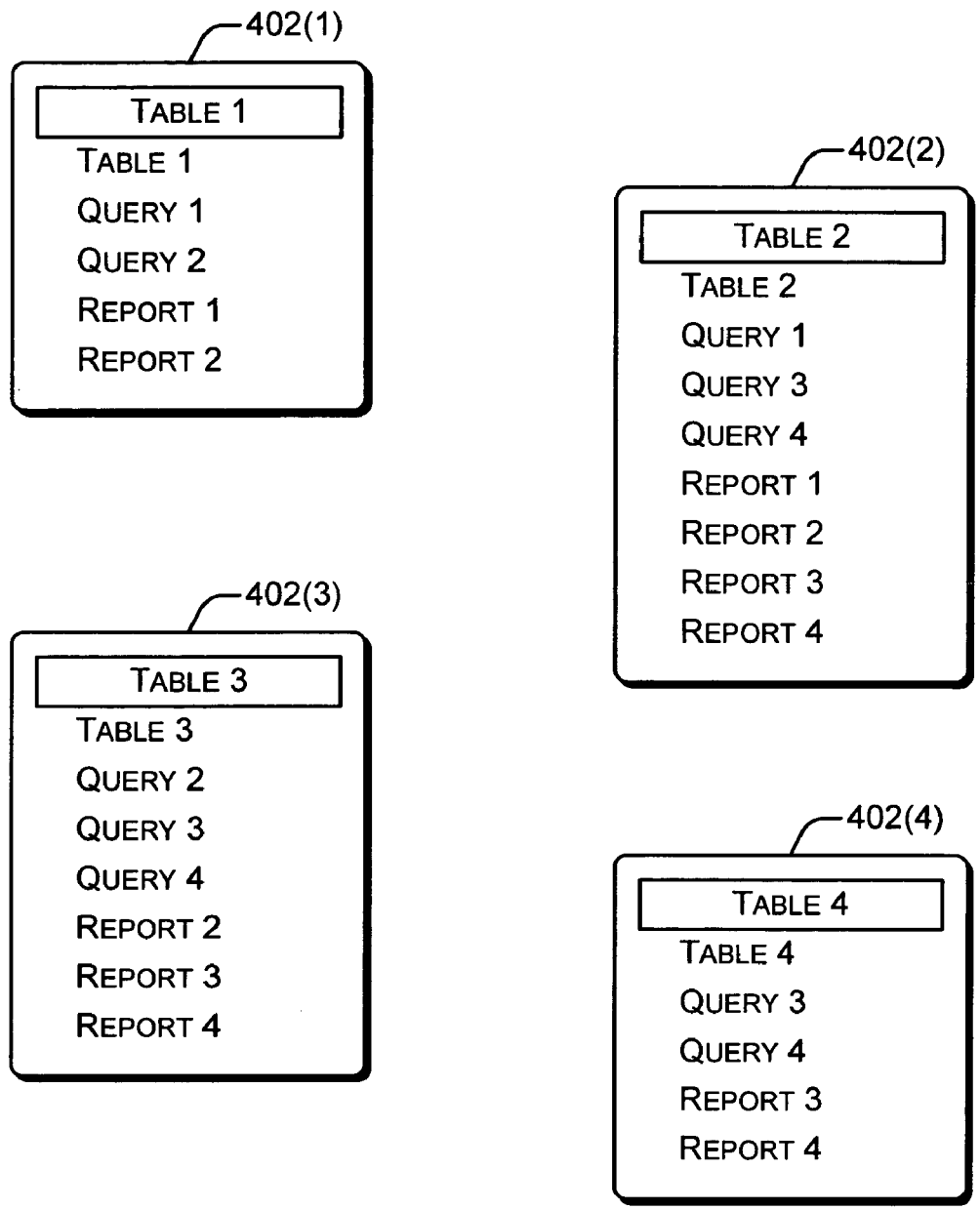
FIG. 4 is an example of object grouping by inter-object dependencies.

FIG. 4 is an example of object grouping 400 by inter-object dependencies. Object grouping 400 is derived from example database 300 (of FIG. 3). The groupings are developed for each table of database 300 and based on each table of database 300. Consequently, there are four (4) groups 402 corresponding to tables 1, 2, 3, and 4.

For each particular group 402 corresponding to a given table, the view objects that depend directly or indirectly from that given table are included in that particular group. Dependencies can be determined for each table starting with each table. For example, the direct object dependencies can be ascertained first. Deeper dependencies can then be traced from these directly-dependent objects to ascertain indirectly dependent objects. Alternatively, dependencies can be determined starting with each view object. With this approach, the one or more tables from which a given view object depends are determined, and then the given view object is added to each respective group corresponding to each respective table of the one or more determined tables.

Database 300 may also maintain (e.g., in a system information table) a dependency tree or other data structure storing the group dependencies. Other approaches may also alternatively be employed to retrieve, determine, acquire, or otherwise know object dependencies and the object dependency groupings derived therefrom.

As illustrated in object grouping 400, the dependency group 402(1) for table 1 includes: table 1, query 1, query 2, report 1, and report 2. With reference to database 300 of FIG. 3, it is apparent that these four view objects (query 1, query 2, report 1, and report 2) are the objects that depend from table 1. The dependency group 402(2) for table 2 includes: table 2, query 1, query 3, query 4, report 1, report 2, report 3, and report 4. The dependency group 402(3) for table 3 includes: table 3, query 2, query 3, query 4, report 2, report 3, and report 4. The dependency group 402(4) for table 4 includes: table 4, query 3, query 4, report 3, and report 4.

Optionally, the table corresponding to the object dependency group may be omitted from the listing thereof However, for navigational convenience in the implementation described further herein below with reference to FIG. 5, the corresponding table is included in each object dependency group.

Using object dependency grouping 400, database objects may be grouped by the subject matter of each table when each table corresponds to an object dependency group. This grouping tends to match the underlying thought processes of users of databases. For example, if table 1 is directed to customers, the queries, reports, etc. that relate to customers are now grouped together. These queries, reports, etc. are likely to pertain to customer contact information, customer invoices, pending customer transactions, and so forth. An example of a GUI that facilitates access to database objects using these groupings is described below with reference to FIG. 5.

Figure 5:
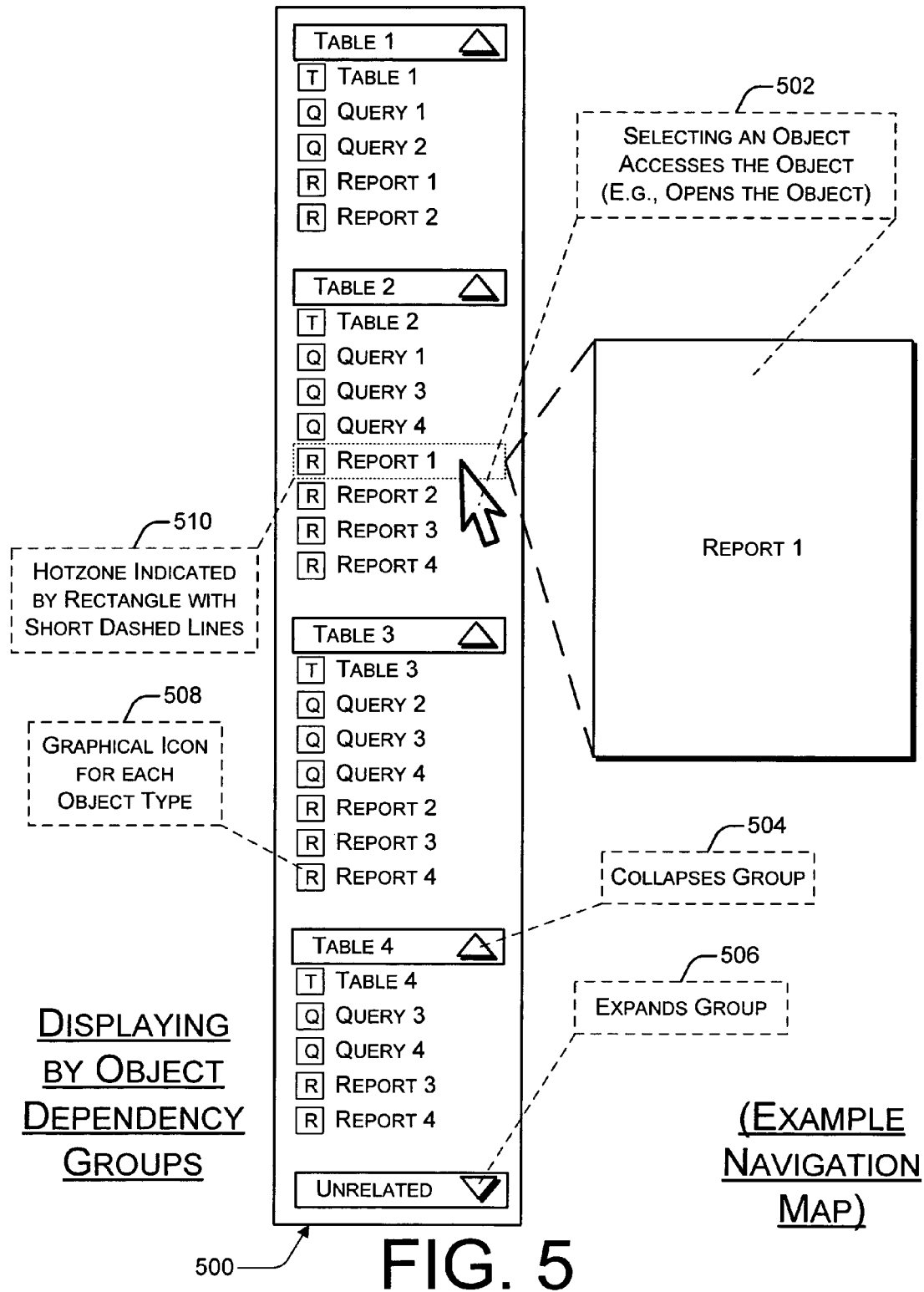
FIG. 5 is an example of displaying database objects by object dependency groups and enabling navigation therewith.

FIG. 5 is an example of displaying database objects by object dependency groups and enabling navigation therewith. The table-based object dependency grouping 400 (of FIG. 4) may be displayed in any manner. For example, groups 402 may be displayed partially or fully. They may be displayed horizontally, vertically, or in a grid. They may also be displayed with or without icons. Other display modes may alternatively be employed.

However, in an illustrated and described implementation, groups 402 of object grouping 400 are displayed vertically with icons as shown in FIG. 5. The vertical column 500 of table-based object dependency grouping 400 functions as an example navigational map. FIG. 5 also includes five (5) annotations 502-510 that are indicated by rectangles formed from medium dashed lines. These annotations 502-510 are not typically actually displayed onscreen; however, they may be displayed (e.g. as a contextual help balloon popup or similar).

The vertical column 500 of table-based object dependency groups 402 may be displayed in its own window, in a pane of a more-comprehensive window, or in some other manner. In a described implementation, the vertical column 500 is displayed in a navigational pane as part of database access program 204. If the vertical column 500 exceeds the available vertical space of the designated pane (or window), then a scroll bar can be added to enable scrolling to unseen portions of the pane. Examples of a scroll bar, a shutter control, etc. are described further herein below with particular reference to FIG. 12.

Five table-based object dependency groups are shown in FIG. 5. The dependency groups corresponding to tables 1, 2, 3, and 4 that are shown in FIG. 5 are also shown in object grouping 400 (of FIG. 4) in a more abstract form. A group corresponding to otherwise unrelated database objects is also shown; the "Unrelated" group is explained further below.

Each displayed table-based object dependency group includes a title bar or header that includes the title of the corresponding table. As illustrated, a group expansion icon (annotation 506) or a group collapsing icon (annotation 504) is included in each title bar depending on the collapsed or expanded state, respectively, of the corresponding object dependency group. Hence, group collapsing icons are included for the already-expanded groups corresponding to tables 1, 2, 3, and 4, and a group expansion icon is included for the currently-collapsed group corresponding to "Unrelated" database objects. Unrelated database objects are those database objects that do not depend from and/or are otherwise unrelated to any data source objects.

The listed entry for each database object is represented textually by the name of the database object. In other words and by way of example, the term "Query 2" is actually represented onscreen by the name for the Query 2 database object. Optionally, each database object may also include an icon associated with each database object type.

Consequently, there are different graphical icons for tables, queries, reports, forms, and so forth. By way of example only, a table icon may be a grid, a query icon may be a folder with a question mark, a report icon may be a notebook, and so forth. In FIG. 5 however, these graphical icons are represented by boxes with a letter therein (i.e., "T" for tables, "Q" for queries, and "R" for reports). Of these graphical icons for each object type, a report icon example is indicated by annotation 508.

Annotation 510 indicates a hotzone that is established around each database object entry in the vertical column 500 of table-based object dependency groups. A hotzone is represented in FIG. 5 with small dashed lines around "Report 1" in the dependency group corresponding to Table 2. These small dashed lines are not actually displayed on the screen. Instead, they represent an area on the screen that is associated with the database object "Report 1". Placing a pointer icon in the hotzone identifies the associated database object as the current target of the user input device operating the pointer icon.

As indicated by annotation 502, selecting a database object to the extent that it is activated causes the database object to be accessed. This accessing may cause descriptive information to be displayed (e.g., in a pop-up window or bubble, a full window, etc.), may cause the database object to be opened and displayed, and so forth. As shown in FIG. 5, selecting the "Report 1" entry in the dependency group corresponding to Table 2 causes the database object "Report 1" to be accessed.

In short, locating the pointer icon in a hotzone associated with a database object causes that database object to become the selection target. Activating the selection target causes the database object to be accessed. The selecting can be by single-clicking-, double-clicking, pressing enter, and so forth, depending on settings of the relevant database program and/or the underlying operating system.

Figure 6:
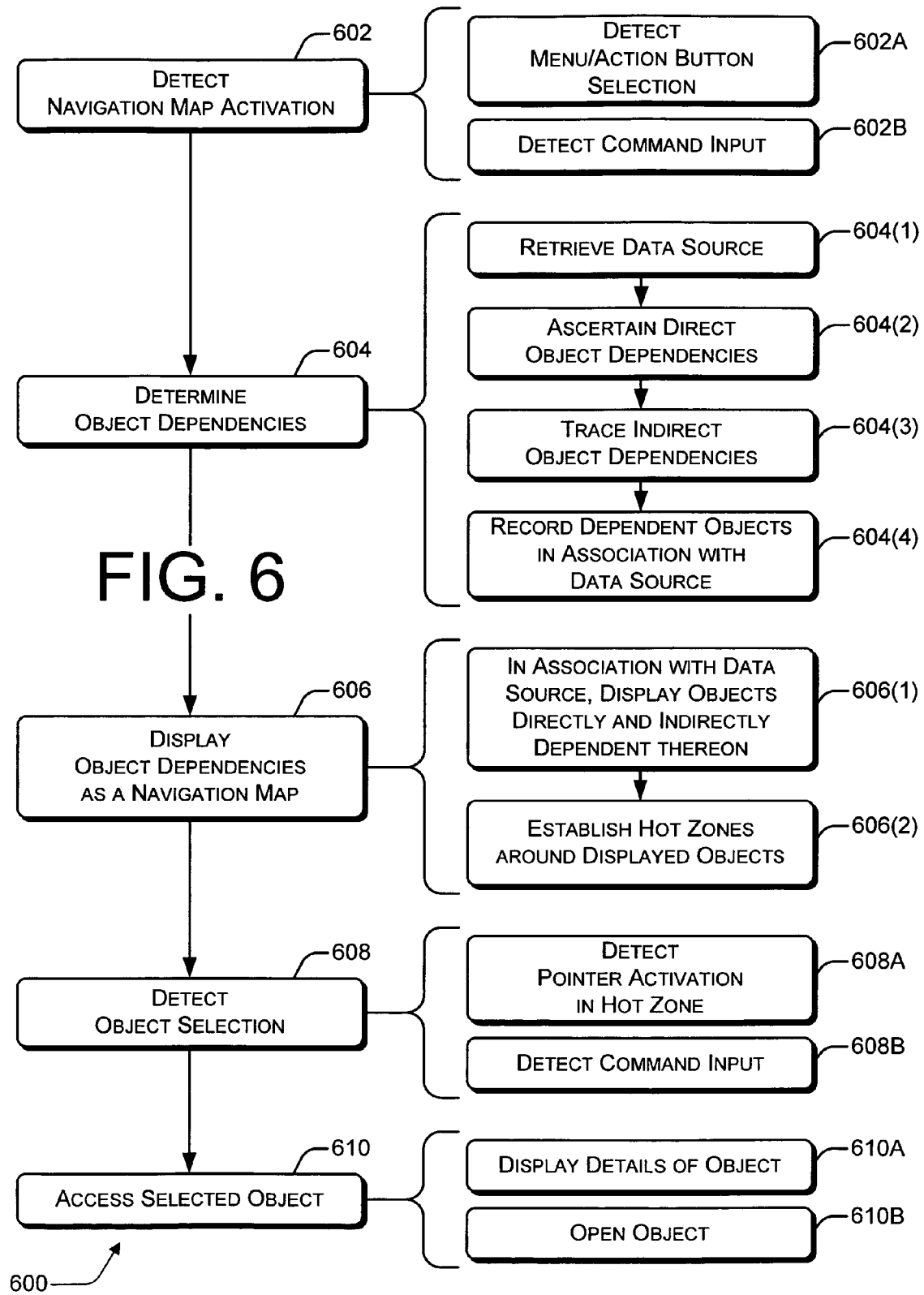
FIG. 6 is a flow diagram that illustrates an example of a method for navigating a database using a navigational map that is organized by object dependencies.

FIG. 6 is a flow diagram 600 that illustrates an example of a method for navigating a database using a navigational map that is organized by object dependencies. Flow diagram 600 includes five (5) primary blocks 602-610 and twelve (12) secondary blocks. Although the actions of flow diagram 600 may be performed in other environments and with a variety of hardware and software combinations, FIGS. 1-5 are used in particular to illustrate certain aspects and examples of the method. By way of example only, the actions of flow diagram 600 may be performed by a database program 204 that is providing access to database 300.

At block 602, activation of a navigational map is detected. For example, it may be detected that a user has activated vertical column 500 having the table-based object dependency groups 402 that function as an example navigational map when displayed as vertical column 500. The navigational map may be brought up in a window or in a pane of a window. This detection may occur by detecting selection of a menu option or an action button (block 602A) or by detecting a (textual) command input (block 602B).

At block 604, object dependencies are determined. For example, direct and indirect dependencies from tables of database 300 may be determined for the view objects thereof. This determination may be accomplished using any of many possible algorithms. Two example algorithms are an upstream algorithm and a downstream algorithm. More specifically, these two algorithms comprise: (i) object dependency determination by checking each view object and tracking upstream dependencies and (ii) object dependency determination by tracing downstream dependencies starting with the tables. Also, direct and indirect object dependencies need not be explicitly determined. For instance, the view objects that depend from a given data source object may be determined without ascertaining whether they are directly or indirectly dependent.

When determining object dependencies by starting first with the tables of database 300: a data source (e.g., a table) is retrieved (block 604(1)), the objects that are directly dependent on the retrieved data source are ascertained (block 604(2)), indirect dependencies are traced from the directly dependent objects to ascertain objects that are indirectly dependent on the retrieved data source (block 604(3)), and the ascertained directly and indirectly dependent objects are recorded in association with the retrieved data source (i.e., they are amalgamated together into a group 402 corresponding to the retrieved data source) (block 604(4)). The actions of blocks 604(1)-604(4) may be repeated for each data source of database 300.

At block 606, data-source-based object dependencies are displayed as a navigational map. For example, the respective determined object groups corresponding to respective tables are displayed as vertical column 500 having the table-based object dependency groups that function as an example navigational map. Each entry of vertical column 500 can include the name of the database object and optionally an icon that is specifically associated to a type of the database object.

To effectuate the action(s) of block 606, database objects that are directly or indirectly dependent on a given data source are displayed in a grouped association with that given data source (block 606(1)) for each data source of database 300. The individual groups 402 can be expanded and collapsed by the user. With at least expanded groups 402, hotzones are established around and/or proximate to each displayed database object entry (block 606(2)).

At block 608, selection of a displayed database object entry is detected. For example, pointer activation in a hotzone may be detected (block 608A), or a (textual) command input may be detected (block 608B). Pointer activation may comprise locating the pointer in the hotzone area associated with the database object followed by additional input (e.g., one or more mouse clicks).

At block 610, the selected database object is accessed responsive to the selection thereof. For example, descriptive details (e.g., a profile, properties, and/or a summary) of the database object may be displayed (block 610A), or the database object may be opened and displayed (block 610B) for the user.

Custom Grouping

Figure 7A:
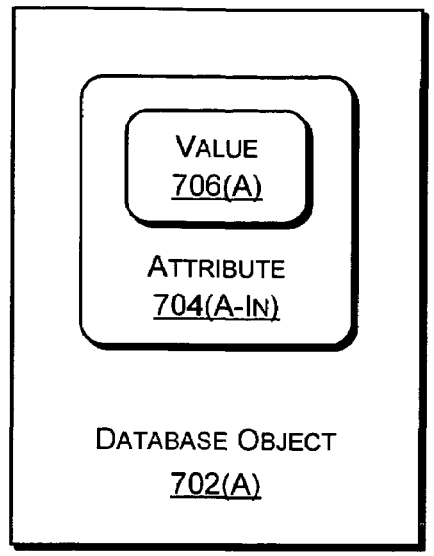
FIGS. 7A and 7B are block diagrams of database objects with examples of associated attributes.
Figure 7B:
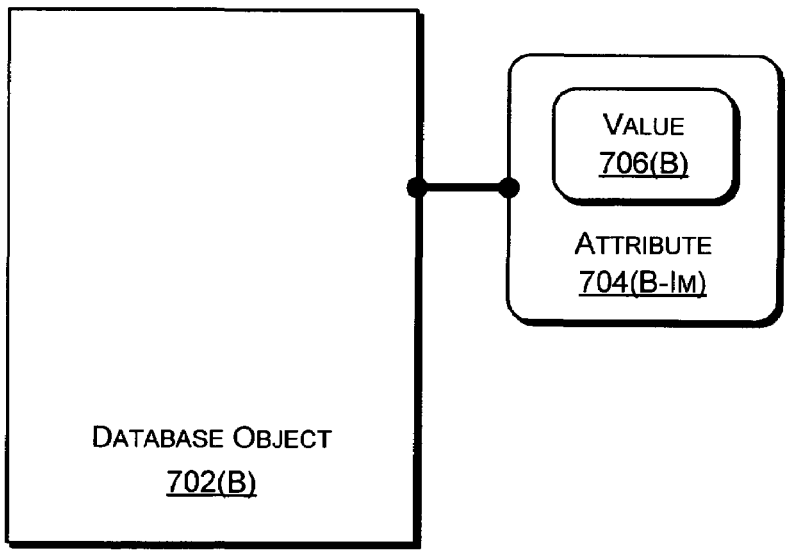

FIGS. 7A and 7B are block diagrams of database objects 702 with examples of associated attributes 704. Database objects 702 represent any general database object of a generic database 100 (of FIG. 1). Hence, by way of example but not limitation, database objects 702 may be data source objects, view objects, and so forth. Database objects 702 may thus be tables, queries, reports, forms, other view objects, and so forth. In a described implementation, each database object 702 may generally be associated with one or more attributes 704.

As illustrated, database object 702(A) of FIG. 7A includes an attribute 704(A-In) that is an intrinsic attribute. In other words, database object 702(A) includes intrinsic attribute 704(A-In) regardless of whether database object 702(A) is involved in a custom grouping operation. For example, intrinsic attribute 704(A-In) may be an attribute that is defined as part of the basic structure, components, etc. of a given table, query, report, and so forth.

Database object 702(B) of FIG. 7B, on the other hand, includes an attribute 704(B-Im) that is an imputed attribute. In other words, database object 702(B) includes imputed attribute 704(B-Im) as a result of some secondary, non-core condition or situation. For example, imputed attribute 704(B-Im) may be an attribute that is associated with database object 702(B) as a result of a custom grouping operation so that it can be assigned a group based on a user-designated attribute even if database object 702(B) is not intrinsically associated with the user-designated attribute. An example procedure for imputing an attribute 704(Im) is described further below with particular reference to FIGS. 10 and 11.

Regardless of whether an attribute 704 is an intrinsic attribute 704(In) or an imputed attribute 704(Im) of a given database object 702, the intrinsic or imputed attribute 704(In or Im) has a value 706. As illustrated, intrinsic attribute 704 (A-In) of database object 702(A) has, includes, and/or is associated with a value 706(A). Also, imputed attribute 704 (B-Im) of database object 702(B) has, includes, and/or is associated with a value 706(B).

Value 706(A) and value 706(B) may be values that are similar (e.g., identical, related, etc.) or dissimilar (e.g., different, unrelated, etc.). Given that associated attribute 704 is the user-designated attribute for a grouping operation, database objects 702(A) and 702(B) are assigned to value-driven groups in accordance with the values 706(A) and 706(B), respectively. If values 706(A) and 706(B) are similar, then database objects 702(A) and 702(B) are assigned to the same designated-attribute-based group. If values 706(A) and 706 (B) are dissimilar, then database objects 702(A) and 702(B) are assigned to different designated-attribute-based groups.

Figure 8:
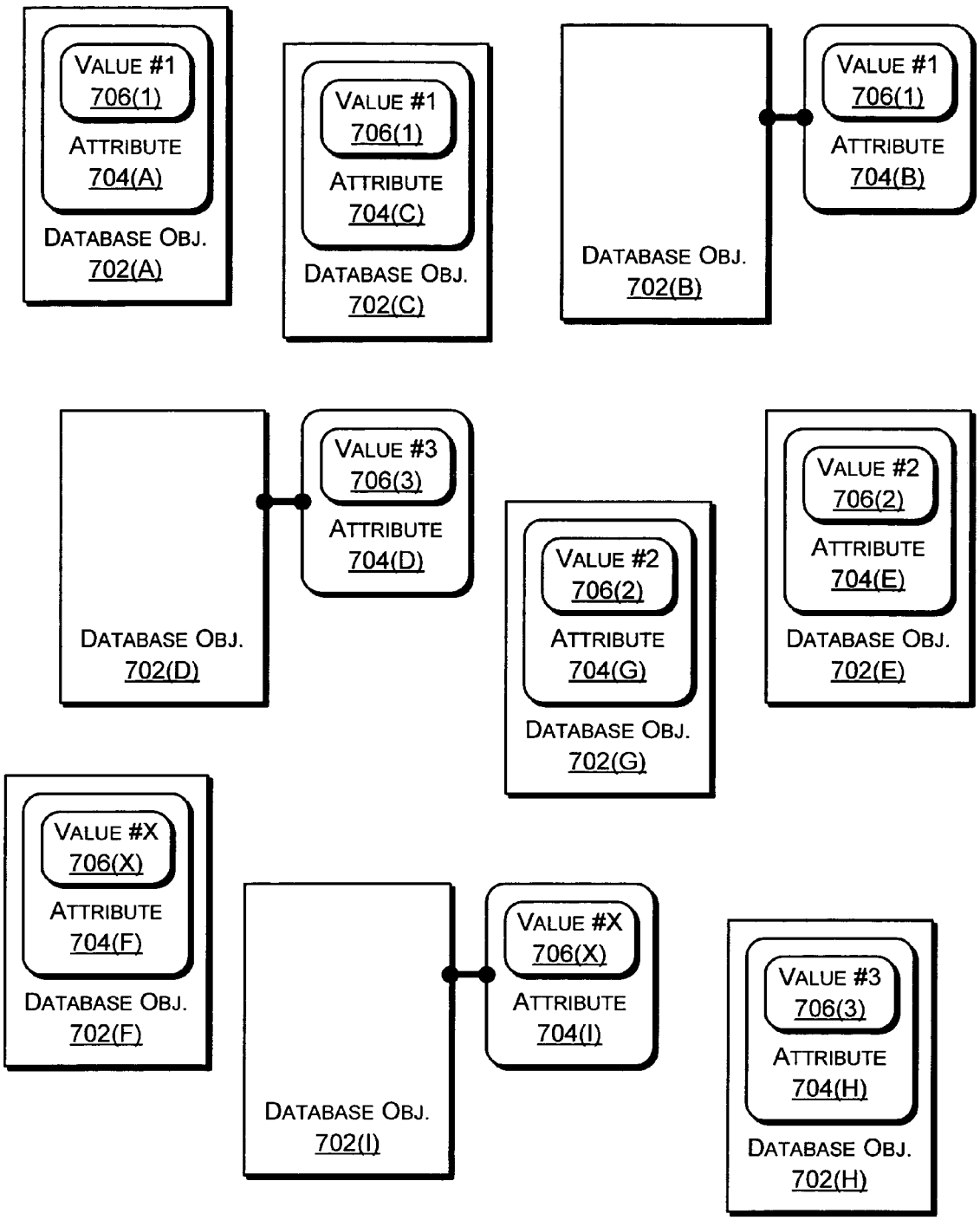
FIG. 8 is a block diagram of multiple example database objects having associated attributes.

FIG. 8 is a block diagram of multiple example database objects 702 having associated attributes 704. As illustrated, multiple database objects 702(A-I) are associated with multiple attributes 704(A-I), respectively. Each of the multiple attributes 704(A-I) has a value 706.

Intrinsic attributes and imputed attributes are not separately indicated by letters (e.g., by "In" and "Im"). However, they are indicated graphically. Attributes 704 that are depicted internal to the block representing their associated database objects 702 are intrinsic attributes 704(In). Attributes 704 that are depicted external to the block representing their associated database objects 702 are imputed attributes 704(Im). Hence, as illustrated for a described example, attributes 704(A), 704(C), 704(E), 704(F), 704(G), and 704(H) are intrinsic attributes 704(In). Also, attributes 704(B), 704(D), and 704(I) are imputed attributes 704(Im).

More specifically, database object 702(A) is associated with attribute 704(A) having a value #1 706(1). Database object 702(B) is associated with attribute 704(B) having a value #1 706(1). Database object 702(C) is associated with attribute 704(C) having a value #1 706(1). Database object 702(D) is associated with attribute 704(D) having a value #3 706(3). Database object 702(E) is associated with attribute 704(E) having a value #2 706(2). Database object 702(F) is associated with attribute 704(F) having a value #X 706(X). Database object 702(G) is associated with attribute 704(G) having a value #2 706(2). Database object 702(H) is associated with attribute 704(H) having a value #3 706(3). Database object 702(I) is associated with attribute 704(I) having a value #X 706(X).

Thus, database objects 702(A), 702(B), and 702(C) are each associated with an attribute 704 having a value #1 706 (1). Database objects 702(E) and 702(G) are each associated with an attribute 704 having a value #2 706(2). Database objects 702(D) and 702(H) are each associated with an attribute 704 having a value #3 706(3). Database objects 702(F) and 702(I) are each associated with an attribute 704 having a value #X 706(X).

Database objects 702 may be associated with any number of attributes 704. A given attribute 704 may take any number of different values 706 (i.e., the variable "X" may be any integer greater than or equal to one). An example of an attribute 704 is "corporate departments". With a "corporate departments" attribute 704, examples of values 706 that may be taken by attribute 704 include: sales, marketing, research and development, legal and corporate affairs, human resources, and so forth.

Figure 9:
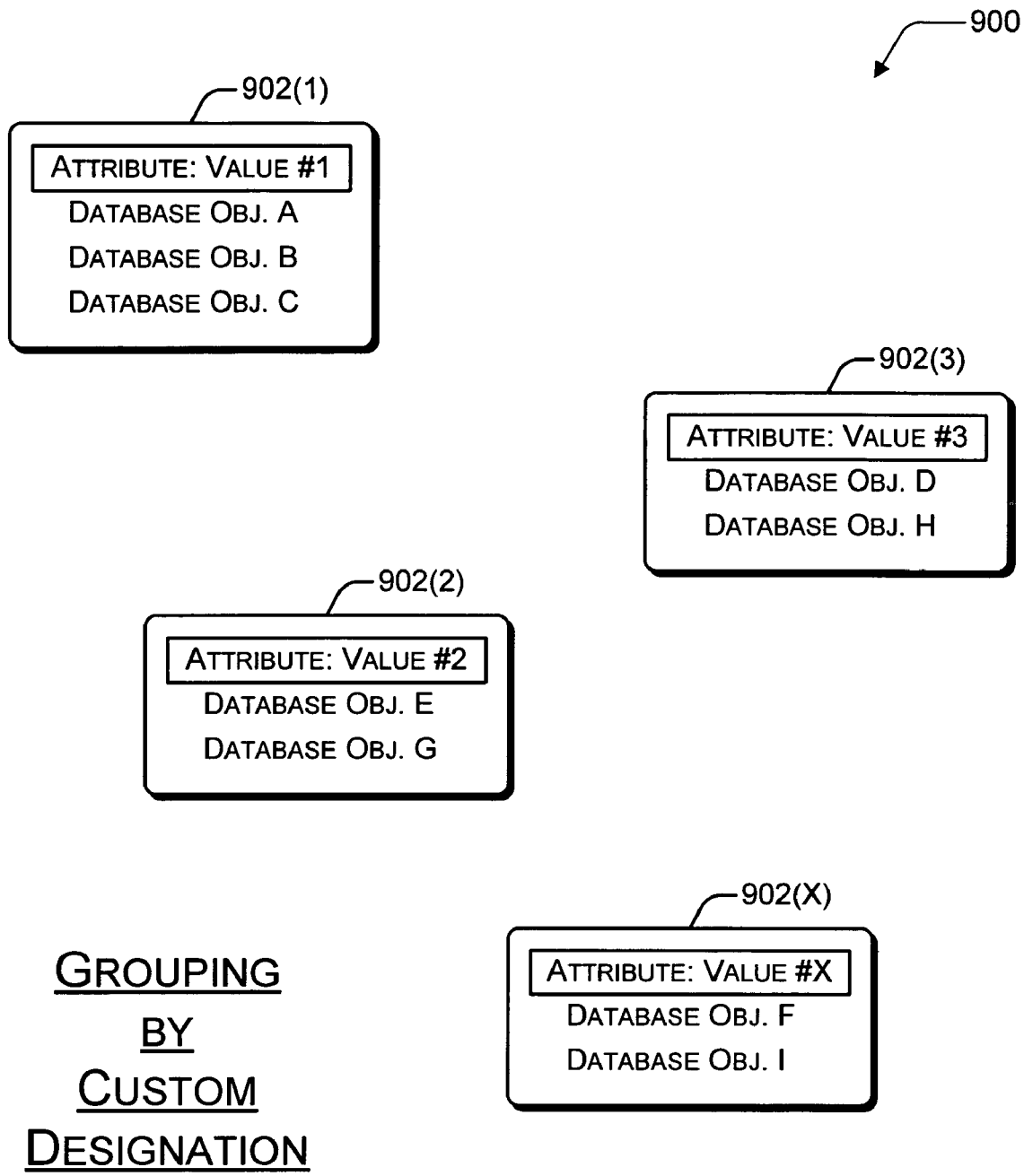
FIG. 9 is an example of database object grouping by custom attribute designation.

FIG. 9 is an example of database object grouping 900 by custom attribute designation. Database object grouping 900 is a custom designation grouping in which a user has designated a particular attribute 704 for the grouping. As illustrated, database object grouping 900 groups database objects 702 in accordance with the example values 706 of attribute 704 that are given above with reference to FIG. 8. Because four different values 706(1), 706(2), 706(3), and 706(X) (i.e., with "X" equal to four) are given in the example of FIG. 8, four different respective groups 902(1), 902(2), 902(3), and 902 (X) comprise database object grouping 900 of FIG. 9.

Specifically, a group 902(1) corresponds to a value #1 706(1) for designated attribute 704. Group 902(1) includes database object A 702(A), database object B 702(B), and database object C 702(C). A group 902(2) corresponds to a value #2 706(2) for designated attribute 704. Group 902(2) includes database object E 702(E) and database object G 702(G). A group 902(3) corresponds to a value #3 706(3) for designated attribute 704. Group 902(3) includes database object D 702(D) and database object H 702(H). A group 902(X) corresponds to a value #X 706(X) for designated attribute 704. Group 902(X) includes database object F 702 (F) and database object I 702(I).

With reference to FIG. 8, although each attribute 704 that is associated with each database object 702 is shown with only one value 706, any given attribute 704 may alternatively include two or more different values 706. By way of example only, attribute 704(G) that is associated with database object 702(G) may also include a value #3 706(3) in addition to value #2 706(2). In such a case, database object 702(G) is assigned to two different groups 902 (of FIG. 9). Specifically, database object G 702(G) would be assigned to group 902(3) corresponding to value #3 706(3) in addition to group 902(2) corresponding to value #2 706(2). Database object 702(G) would also be displayed with both groups 902(2) and 902(3) in a navigational map, an example of which is described below with particular reference to FIG. 10.

Figure 10:
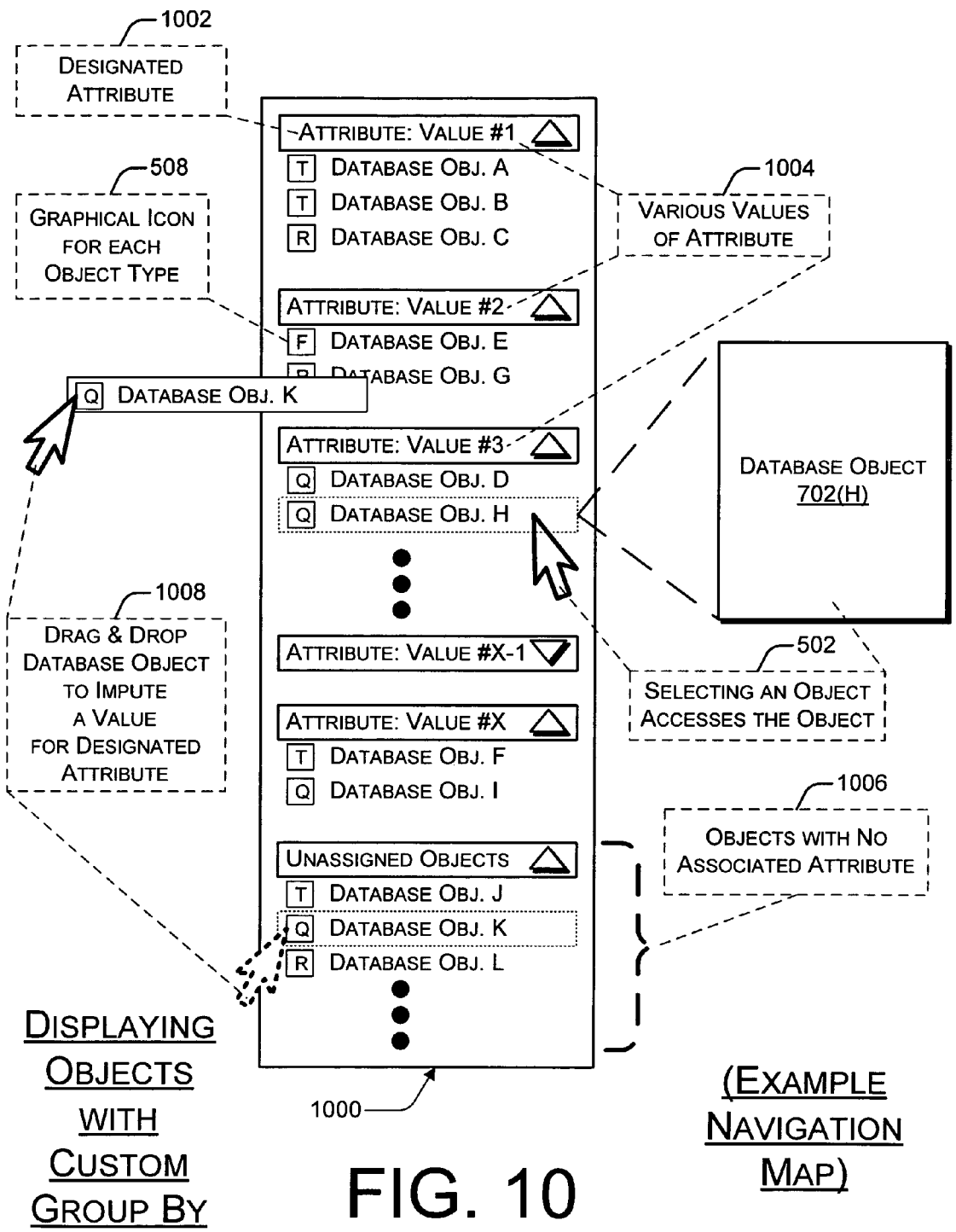
FIG. 10 is an example of displaying database objects by object groups corresponding to values of a user-designated attribute and enabling navigation therewith.

FIG. 10 is an example of displaying database objects by object groups corresponding to values of a user-designated attribute and enabling navigation therewith. The designatedattribute-based, value-driven object grouping 900 (of FIG. 9) may be displayed in any manner. For example, groups 902 may be displayed partially or fully. They may be displayed horizontally, vertically, or in a grid. They may also be displayed with or without icons. Other display modes may alternatively be employed.

However, in an illustrated and described implementation, groups 902 of object grouping 900 are displayed vertically with icons as shown in FIG. 10. A vertical column 1000 of designated-attribute-based, value-driven object grouping 900 functions as an example navigational map. In addition to annotations 502 and 508 (which are described more fully herein above with particular reference to FIG. 5), FIG. 10 also includes four (4) annotations 1002-1008 that are indicated by rectangles formed from medium dashed lines. These annotations 1002-1008 are not typically actually displayed onscreen; however, they may be displayed (e.g. as a contextual help balloon popup or similar).

The vertical column 1000 of designated-attribute-based, value-driven object groups 902 may be displayed in its own window, in a pane of a more-comprehensive window, or in some other manner. In a described implementation, however, the vertical column 1000 is displayed in a navigational pane as part of database access program 204. If the vertical column 1000 exceeds the available vertical space of the designated pane (or window), then a scroll bar can be added to enable scrolling to unseen portions of the pane.

Five attribute-based, value-driven object groups are shown in FIG. 10 as part of the vertical column 1000. Four of these five displayed attribute value groups correspond to the attribute values #1, #2, #3, and #X as shown in the vertical column 1000. These four displayed attribute value groups are also shown in object grouping 900 (of FIG. 9) in a more abstract form. An attribute value group corresponding to an otherwise non-illustrated value #(X-1) 706(X-1) is also shown to represent a collapsed group that may be expanded as indicated by the expansion icon.

Each displayed attribute value group includes a title bar or header that indicates (e.g., includes) the corresponding value of the various possible values of the designated attribute. These values of the designated attribute that are displayed in the group headers are indicated by annotation 1004. As indicated by annotation 1002, the designated attribute may also be displayed at each header. Alternatively, the designated attribute may be displayed once at the top (or bottom) of the vertical column 1000, in another pane or window, in the title portion of a sub-window or the overall main window, and so forth.

A group collapsing icon is included in each title bar for values #1, #2, #3, and #X of the designated attribute. The listed entry for each database object is represented textually by the name of the database object. In other words and by way of example, the term "Database Obj. B" is actually represented onscreen by the name for the database object B 702 (B).

Optionally, each database object entry may also include an icon that is associated with each database object type. Consequently, there are different graphical icons for tables, queries, reports, forms, and so forth. In FIG. 10 these graphical icons are represented by boxes with a letter therein (i.e., "T" for tables, "Q" for queries, "R" for reports, and "F" for forms). Of these graphical icons for each database object type, a form icon example is indicated by annotation 508.

Although not explicitly indicated by an annotation, a hotzone is depicted with respect to "Database Obj. H" by the small dashed lines around its entry. As indicated again by annotation 502, selecting a database object 702 causes the database object 702 to be accessed. The selecting may be accomplished by highlighting and activating (e.g., by selecting and left-clicking) the database object 702. This accessing may cause descriptive information to be displayed (e.g., in a pop-up window or bubble, a full window, etc.), may cause the database object to be opened and displayed, and so forth. As shown in FIG. 10, selecting the "Database Obj. H" entry in the attribute value group corresponding to attribute value #3 causes the database object "Database Object 702(H)" to be accessed.

As described above with particular reference to FIG. 5, locating a pointer icon in a hotzone associated with a database object entry causes that database object to become the selection target. Selecting the selection target causes the database object to be accessed. The selecting can be by single-clicking, double-clicking, pressing enter, and so forth, depending on settings of the relevant database program and/or the underlying operating system.

A designated attribute 704 may not be intrinsically associated with each and every database object 702 of a database of interest. Consequently, some database objects 702 cannot be automatically assigned to any attribute-based, value-driven object group 902. As indicated by annotation 1006, these database objects 702 are listed in an unassigned objects group. In other words, database objects 702 that are not currently intrinsically or imputedly associated with the designated attribute 704 have entries under a heading entitled "Unassigned Objects" or similar.

Nevertheless, these unassigned database objects 702 may be assigned to an attribute value group by imputing an associated attribute 704 having a given value 706 to any one or more of them. This imputing may be effectuated by textual command input, by a mechanism using menus or action buttons, by an option available through a context menu (e.g., from a right-click or other special activation mechanism), and so forth. However, in a described implementation, this imputing is effectuated using a dragging and dropping mechanism as indicated by annotation 1008.

As illustrated at annotation 1008, an entry for a query-type database object entitled "Database Obj. K" is dragged from a listing for the unassigned database objects and dropped into the attribute value group corresponding to value #2 of the designated attribute. This dragging and dropping causes value #2, for the designated attribute 704, to be imputed to database object K 702(K). Other unassigned database objects 702 may have values imputed thereto or may be left in the unassigned objects group. Imputing a value 706 to an attribute 704 may be temporary or permanent. Also, it may optionally be passed on to dependent database objects.

Database object dependency, as described in greater detail herein above with particular reference to FIGS. 3-6, may be considered relationship information between and among different database objects 702. In other words, attribute 704 may represent relationship information such as inter-object dependence. Values 706 may therefore comprise references to data source objects from which the associated database objects depend directly or indirectly.

When this relationship attribute 704 is designated by a user to define a custom grouping, the different values 706 comprise references to (e.g., names of) data source objects. Consequently, each database object 702 in this scenario is associated with an attribute 704 that may take on one or more values 706 of references to the data source objects of a given database. This scenario is thus equivalent to dependency-based object grouping as described herein above in the section entitled "Object Dependency". Hence, from this perspective, designated-attribute-based and value-driven object grouping 900 may be considered a superset of dependency-based object grouping 400.

Figure 11:
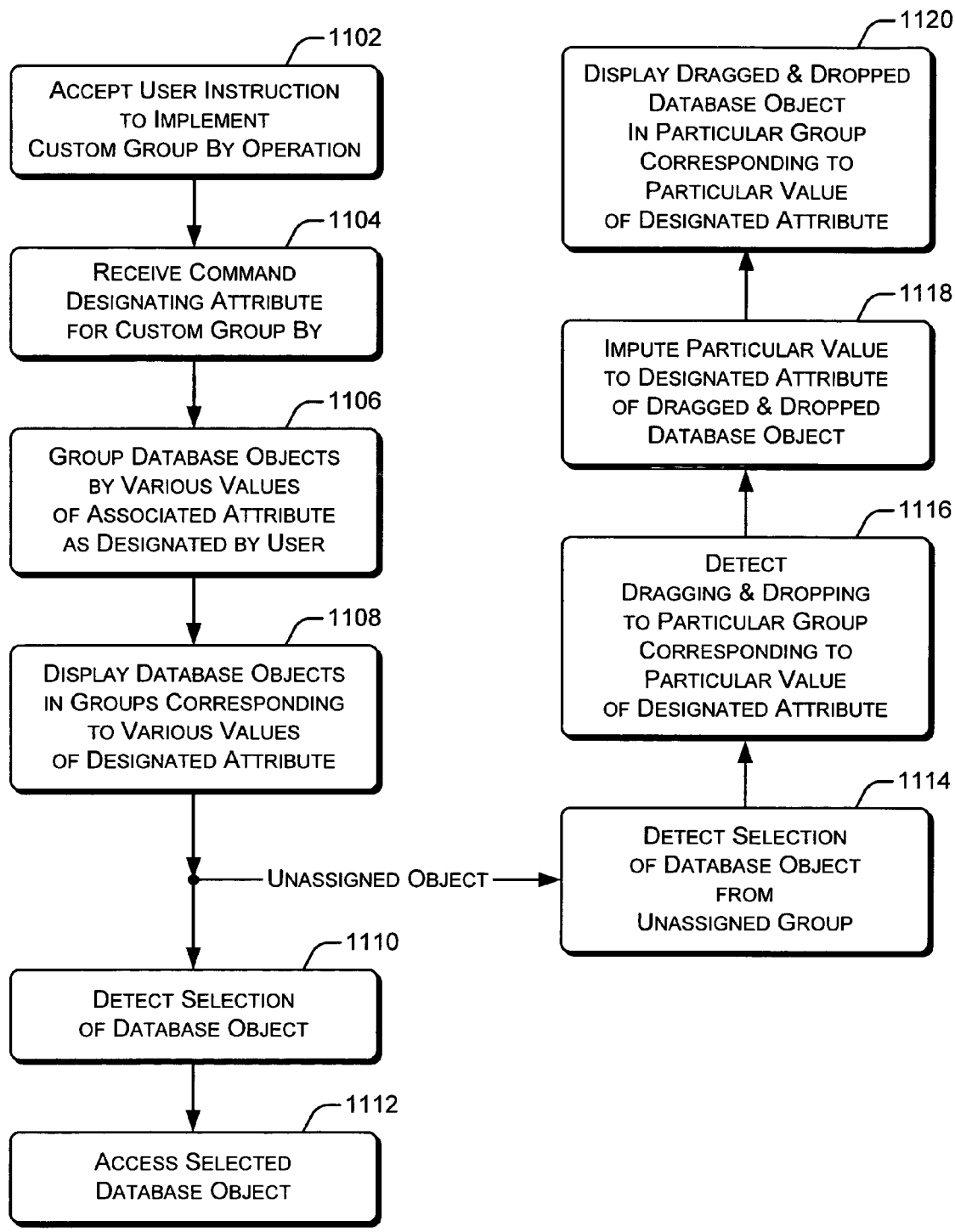
FIG. 11 is a flow diagram that illustrates an example of a method for interacting with a database using a navigational map that is organized responsive to a custom attribute designation.

FIG. 11 is a flow diagram 1100 that illustrates an example of a method for interacting with a database using a navigational map that is organized responsive to a custom attribute designation. Flow diagram 1100 includes ten (10) blocks 1102-1120. Although the actions of flow diagram 1100 may be performed in other environments and with a variety of hardware and software combinations, FIGS. 1-2 and 7A-10 are used in particular to illustrate certain aspects and examples of the method. By way of example only, the actions of flow diagram 1100 may be performed by a database program 204 that is providing access to a database having at least objects 702(A-I) and 702(K).

At block 1102, a user instruction to implement a selected custom group by operation is accepted. For example, a user may activate a custom group-by feature using a textual command input, a drop-down menu, an option dialog, a tool button, and so forth. Although specific user interface mechanisms are not explicitly repeated for the flow diagram 1100 of FIG. 11, the analogous user interface mechanisms illustrated in the flow diagram 600 of FIG. 6 and described herein above are likewise applicable to the actions of flow diagram 1100.

At block 1104, a command designating an attribute for the custom group-by operation is received. For example, a user may designate an attribute 704. This designated attribute 704 may be intrinsically associated with one or more database objects 702 or may be only an imputed attribute 704. The designation may be effectuated by the user with a textual command input, by menu or button selection, by clicking on an attribute 704 of a database object 702, and so forth. For example, right-clicking on an attribute 704 may precipitate a display of a set of options including a custom group by attribute designation command option.

At block 1106, database objects are grouped in accordance with various values held by their respective associated attributes responsive to the user-designated attribute. For example, respective database objects 702(A-I) may be custom grouped 900 in accordance with the various values 706 (1,2,3,X) taken by their respective attributes 704(A-I) as shown by groups 902(1,2,3,X).

At block 1108, database objects are displayed in groups corresponding to various values of the designated attribute. For example, database objects 702 may be displayed in vertical column 1000 in groups that are delineated by headers that indicate the corresponding values (annotation 1004) of the designated attribute (annotation 1002). An unassigned group (annotation 1006) may also be displayed in vertical column 1000.

At block 1110, selection of a database object is detected. For example, a database object 702 that is assigned to an attribute value group or that is still unassigned may be selected. At block 1112, the selected database object is accessed. For example, property-type or other descriptive details of the selected database object 702 and/or the selected database object 702 itself may be displayed.

Blocks 1114-1120 pertain primarily to unassigned database objects 702 for which an attribute value is to be imputed. However, the dragging and dropping mechanism may alternatively also be used for changing attribute values when a previously assigned database object 702 is dragged from a first attribute value group and dropped at a second attribute value group within vertical column 1000.

At block 1114, selection of a database object that is currently located in the unassigned group is detected. For example, selection of the entry for "Database Obj. K" within the unassigned objects group (annotation 1006) may be detected.

At block 1116, dragging and dropping of the selected database object to a particular group corresponding to a particular value taken by the designated attribute may be detected. For example, it may be detected that a user is dragging the entry for "Database Obj. K" from the unassigned objects group (annotation 1006) and dropping the entry for "Database Obj. K" in the display area for group 902(2) corresponding to value #2 706(2) (annotation 1008).

At block 1118, the particular value for the designated attribute is imputed to the dragged and dropped database object. For example, value #2 706(2) for the designated attribute 704(K) (not explicitly shown) may be imputed to database object K 702(K).

At block 1120, the dragged and dropped database object is displayed in the particular group corresponding to the particular value of the designated attribute. For example, the entry for "Database Obj. K" may be displayed under the heading for value #2 706(2) for the designated attribute 704 in vertical column 1000.

Navigation Pane Features

Figure 12:
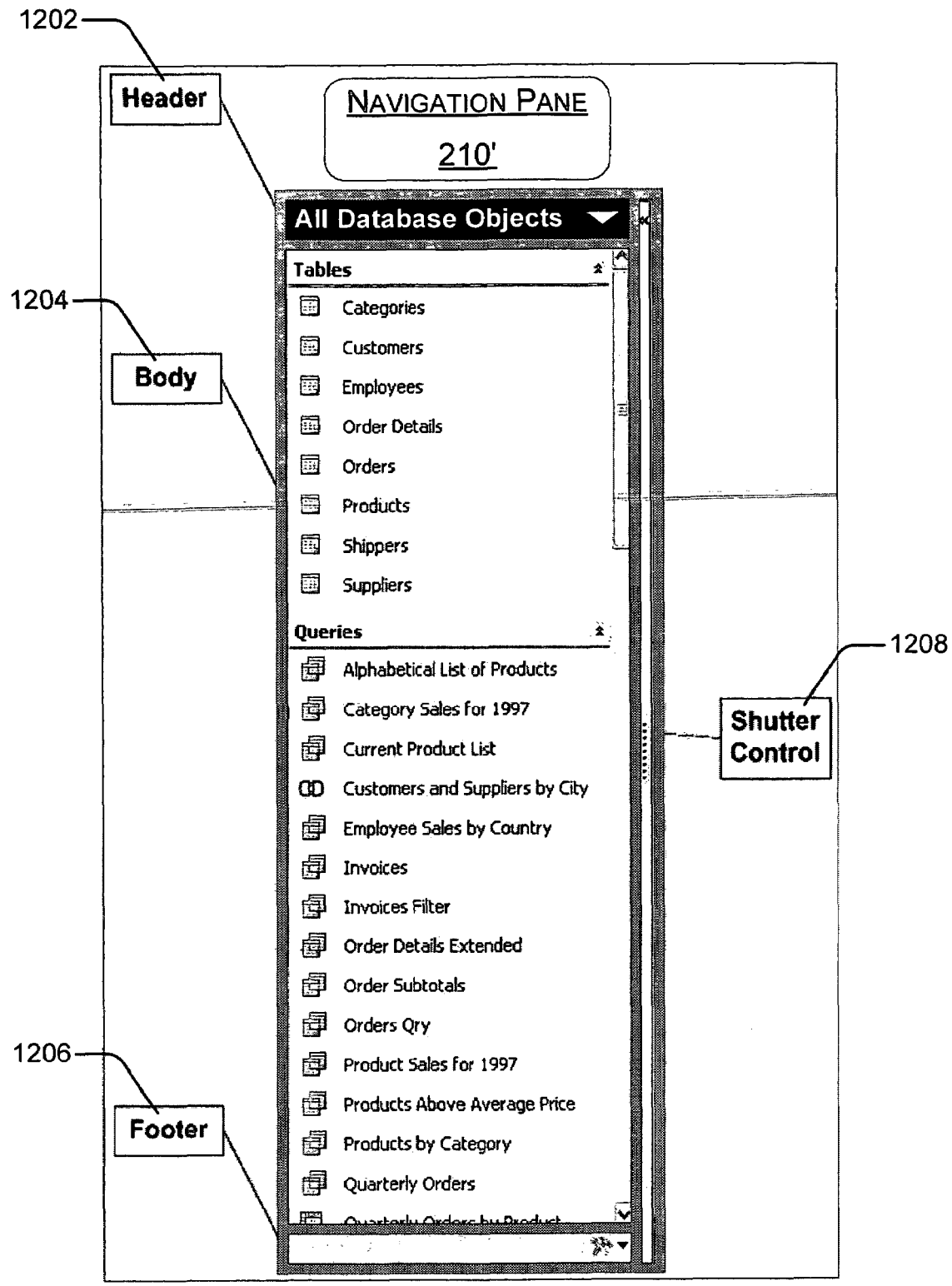
FIG. 12 is a specific example of a navigation pane that individually identifies a header section, a body section, a footer section, and a shutter control section.

FIG. 12 is a specific example of a navigation pane 210' that individually identifies a header section 1202, a body section 1204, a footer section 1206, and a shutter control section 1208. Navigation pane 210' is a specific example of the general navigation pane 210 (of FIG. 2). Generally, a navigation pane 210 can differ substantially from navigation pane 210' in terms of the types and numbers of sections, the illustrated layout of the various sections, the content of the various sections, and so forth. By way of example, the groupings by object type into tables and queries as well as the names of the different database objects are for illustrative and explanatory purposes only.

As illustrated, navigation pane 210' is divided into four sections: a header 1202, a body 1204, a footer 1206, and a shutter control 1208. As shown, header 1202 is entitled "All Database Objects". Examples of header 1202 are described further herein below with particular reference to FIGS. 13A and 13B. Body 1204 occupies the majority of the screen space devoted to navigation pane 210'. Examples of body 1204 are described further herein below with particular reference to FIGS. 14A, 14B, 14C, and 14D.

Footer 1206 provides access to additional control features of navigation pane 210'. Examples of footer 1206 are described further herein below with particular reference to FIGS. 15A, 15B, 15C, and 15D. Shutter control 1208 can be used to change the width of navigation pane 210' and/or to totally shutter (e.g., completely close) navigation pane 210'.

Figure 13A:
FIGS. 13A and 13B are specific examples of the header section of the navigation pane of FIG. 12.
Figure 13B:
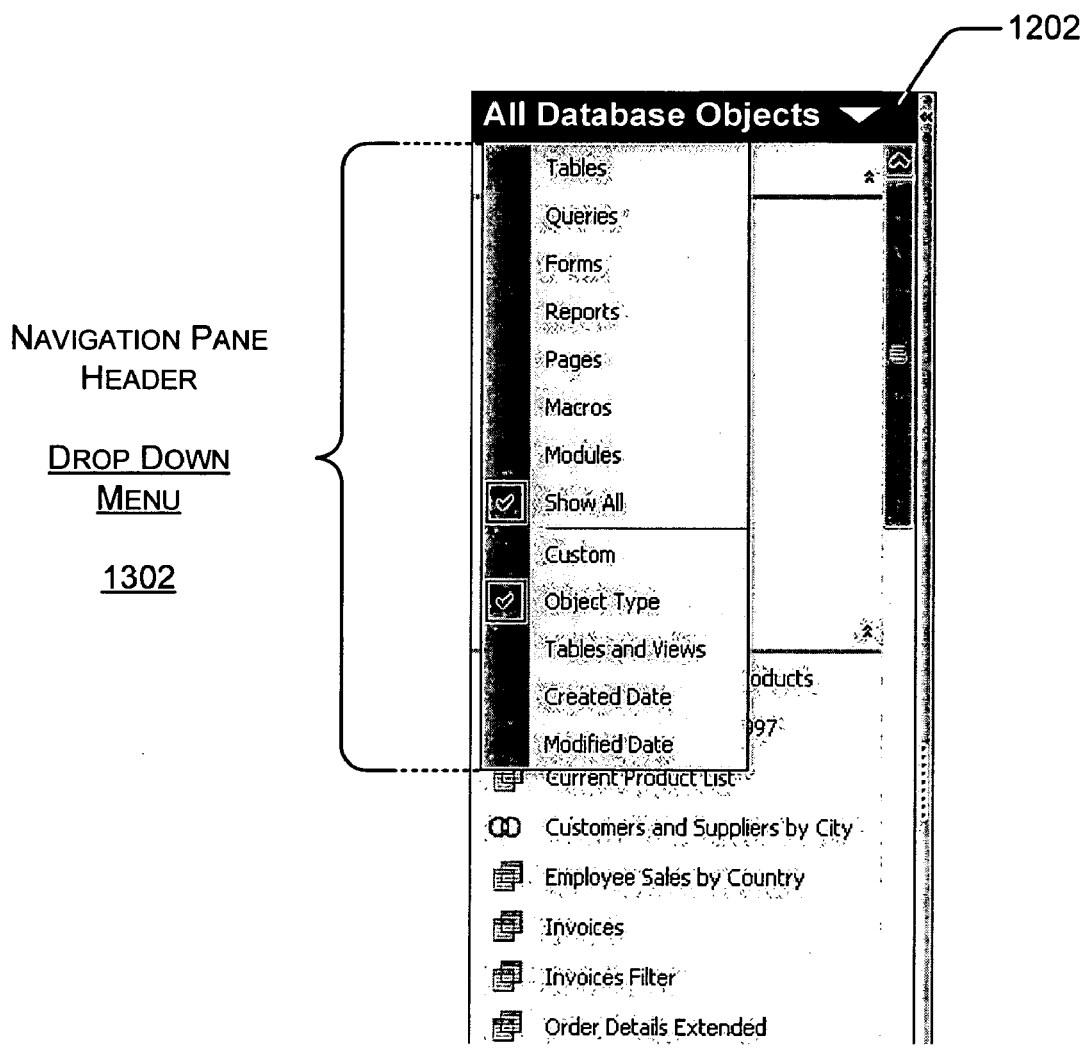

FIGS. 13A and 13B are specific examples of header section 1202 of navigation pane 210'. FIG. 13A illustrates navigation pane header 1202 in a "hover over mode". More generally, this implies that header 1202 is currently highlighted via a keyboard, a mouse, or another user input device. In a described implementation, header 1202 has a single control. Activating the control of header 1202 precipitates the appearance of a navigation pane header drop down menu.

FIG. 13B illustrates an example drop down menu 1302 for the navigation pane header 1202. Navigation pane header drop down menu 1302 displays the groups for the selected grouping and a list of available groupings, with a dividing line separating the two portions. In a described implementation, user-designated groupings are displayed first, but other orders may alternatively be implemented.

As shown in FIG. 13B, drop down menu 1302 for header 1202 indicates that "Object Type" is the designated attribute for custom grouping (and display). The group(s) to be displayed are indicated to be all groups (i.e., "Show All") of the "Object Type" grouping. Although other indication mechanisms may alternatively be employed, the illustrated indication for a display selection is a checked box, so the selected display group(s) is "Show All", and the selected custom grouping or "Group By" is "Object Type".

Selecting a displayed group option results in a filtering to that group and checks that menu item. Selecting a grouping (i.e., a "Group By") changes the display of items in navigation pane 210' to that grouping, checks that menu option, and displays the last group that the user had selected for the selected grouping. To accomplish this, the state of the groups and the custom groupings are preserved. For example, opened groups and the last applied group filter may be stored.

Figure 14A:
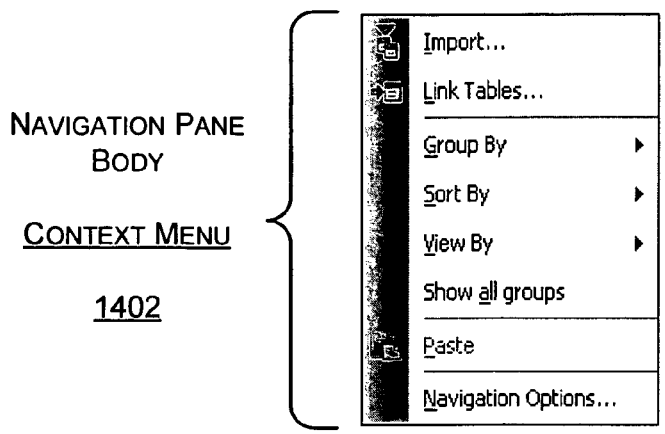
FIGS. 14A, 14B, 14C, and 14D are specific examples of the body section of the navigation pane of FIG. 12.
Figure 14B:
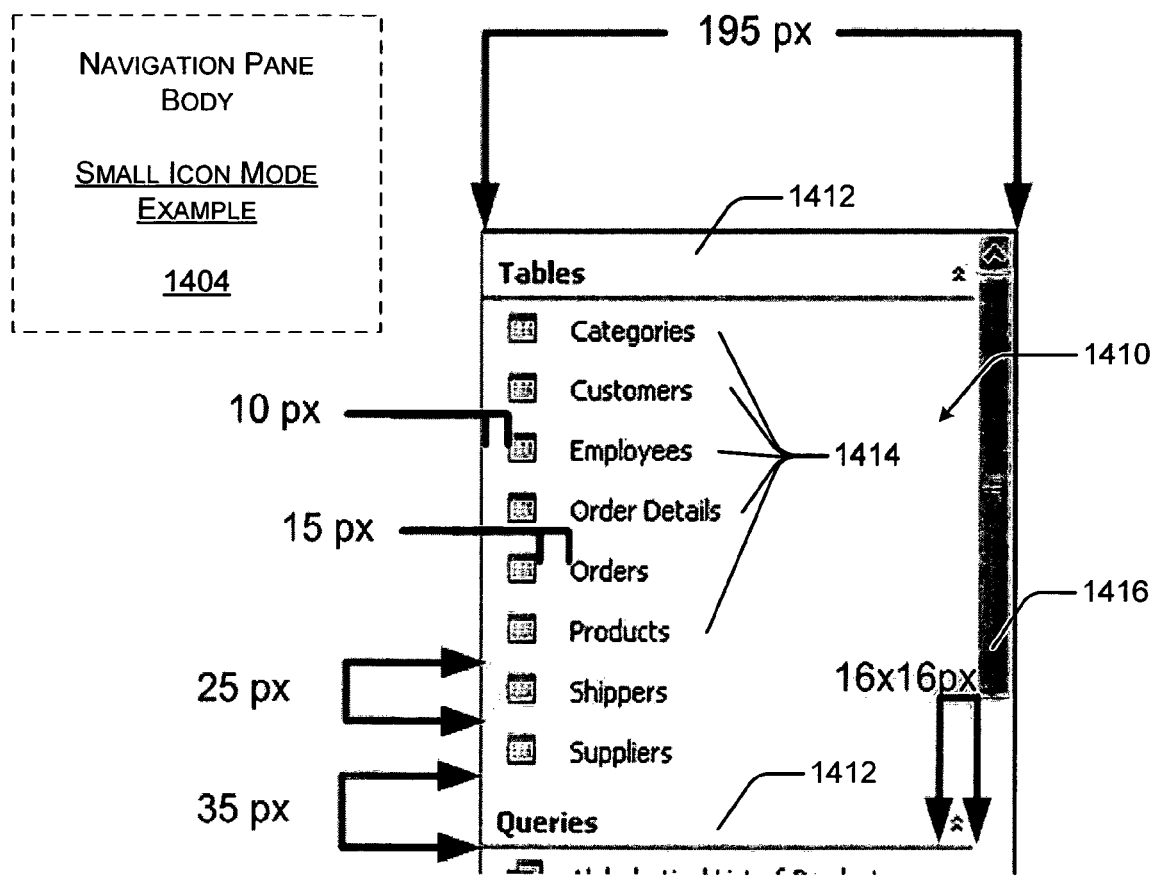
Figure 14C:
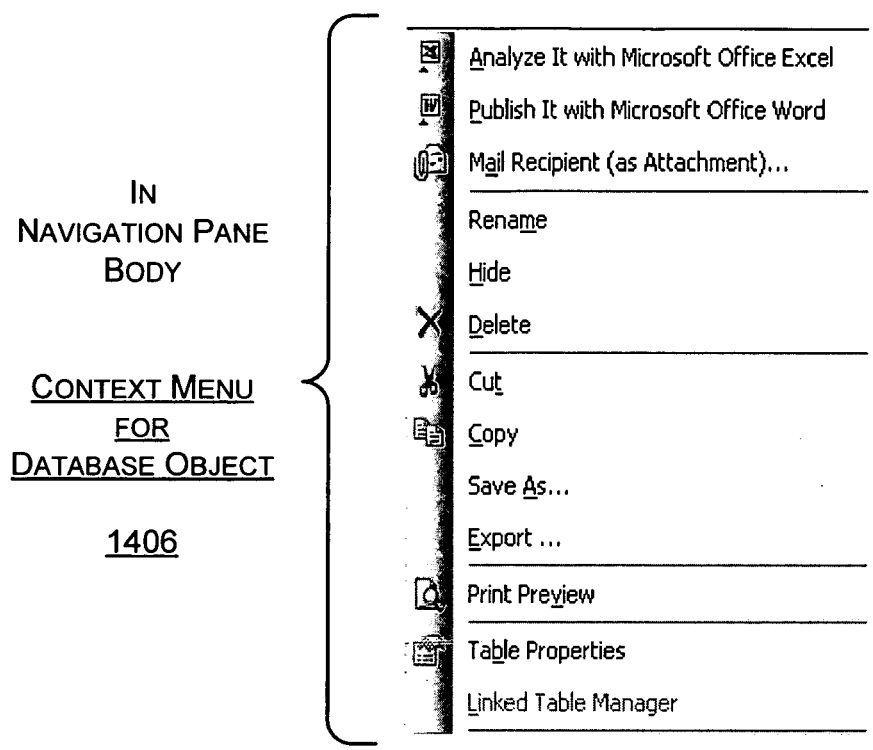
Figure 14D:
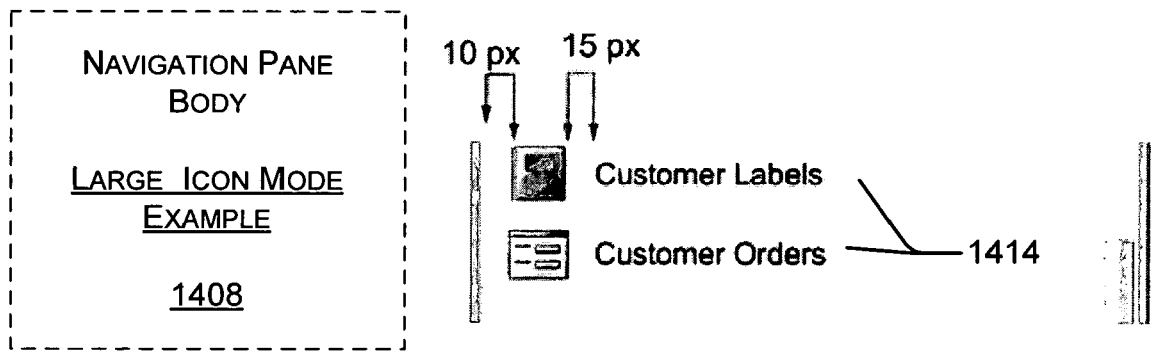

FIGS. 14A, 14B, 14C, and 14D are specific examples of body section 1204 of navigation pane 210'. Specifically, FIG. 14A illustrates a context menu 1402 for navigation pane body 1204, FIG. 14B illustrates a small icon mode example 1404 for navigation pane body 1204, FIG. 14C illustrates a context menu for a database object 1406 listed in body 1204 of navigation pane 210', and FIG. 14D illustrates a large icon mode example for a navigation pane body 1204.

The largest portion of navigation pane 210' in terms of screen space is navigation pane body 1204. Body 1204 actually displays the majority of the navigation information for a database. As shown in FIG. 14B, within body 1204 is a scroll viewer 1410, one or more group headers 1412, and the listed item entries 1414 of database objects. Navigation pane 210' is a scrollable window or window pane. When there are too many object entries, a scroll bar 1416 appears to enable the user to scroll through the database objects.

Additionally, in a described implementation, a type ahead mechanism is employed. For example, typing a character selects a particular view that starts with that character (e.g., in a top down manner using the sort order). If character typing is continued, the selection matching is updated. The type ahead selects both groups as well as database objects when groups are visibly displayed.

For a described implementation, an example type ahead hypothetical that includes a sample list is presented below:

The searching of item entries can start from the first listed (e.g., top) item entry or the currently-selected item entry. In a described implementation, the type ahead starts from (but not including) the current selection and then selects the next relevant item entry. It is implemented as full string type ahead:

Given the following list, where the first item is selected:
ReportViewer←Currently Selected
HotIssuesOld
Chart of Priority
Chart of Feature Area Investments
Chart of Specs by Feature Area
TasksSubForm
Specs
HotIssuesForm
HotIssuesDatasheet
HotIssues
Home
FormContainer
Type "H"
HotIssuesOld is selected.
Keep typing (i.e., no pause) "OT"
HotIssuesOld is still selected.
Keep typing (no pause) "ISSUESF"
HotIssuesForm is selected.
<<Pause>>
Type "H"
HotIssuesDatasheet is selected.
<<Pause>>
Type "H"
HotIssues is selected.
Keep Typing "O"
HotIssues is still selected.
Keep Typing "M"
Home is selected.
<<Pause>>
Type "H"
Start over at the beginning.

The background of scroll viewer 1410 has an available context menu, which is termed the navigation pane body context menu 1402 of FIG. 14A. The context menu 1402 is displayed responsive to a non-standard input mechanism. For example, a right-click of a mouse may be a non-standard input mechanism if a left-click of the mouse is a standard input mechanism. Also, a "Ctrl+Enter" keyboard combination may be a non-standard input mechanism if pressing "Enter" is a standard input mechanism.

Context menu 1402 for navigation pane body 1204 includes, by way of example only, an import feature; a link tables feature; "Group By", "Sort By", and "View By" entries and respective submenus thereof; a show all groups command; a paste command; a navigation options feature; and so forth.

Small icon mode example 1404 of FIG. 14B includes multiple examples of specific pixel widths and sizes. For example, there are (from left to right) 10 pixels before and 15 pixels after each small icon at each listed entry 1414. Also, each item entry 1414 is 25 pixels high. Each group header 1412 is 35 pixels high, and it enables the hiding or showing of items with a single click (e.g., using group collapsing or expansion icons, respectively). Other implementations may have different pixel widths and sizes.

Although not shown, there is an available context menu that is accessible for each group at each group's respective group header 1412. In a described implementation, the context menu for each group header 1412 includes the following options:

Paste—Pastes an object into the navigation pane. In the event that it is a custom group, the paste puts the object shortcut in that group. In other cases, the paste puts the object in the appropriate location.
Collapse Group—Collapses the selected group.
Expand All—Expands all of the groups shown in the navigation pane.
Collapse All—Collapses all of the groups shown in the navigation pane.
Show only "abc_xyz"—"abc_xyz" is replaced by the appropriate group name. This allows the user to filter the navigation pane by the selected group.
Hide—Hides the selected group and all the contents thereof.

Generally, groups are not displayed when filtered out. They are restored, however, when "Show All" is selected, for example.

Each listed entry 1414, as shown in FIG. 14B, also has an associated context menu. Specifically, within the navigation pane body 1204, there is an available context menu 1406 for each database object corresponding to a listed entry 1414. An example context menu for database objects 1406 is shown at FIG. 14C.

Context menu 1406 for a database object that is listed at navigation pane body 1204 includes, by way of example only, an analyze it feature; a publish it feature; a mail command; a rename command; a hide command; delete, copy, and cut commands; save as and export commands; a print preview command; a table properties feature; and so forth.

Listed entries for database objects 1414 within body 1204 of navigation pane 210' may be displayed in any of multiple possible modes. Four example view modes are described herein. These four example display modes include: a thumbnail view mode, a small icon mode, a large icon mode, and a details mode. The small and large icon modes are also illustrated (in FIGS. 14B and 14D, respectively).

Thumbnail view mode includes a thumbnail (e.g., a small preview) of each database object corresponding to a listed entry 1414. An example small icon mode 1404 is illustrated in FIG. 14B. As is apparent, each icon is relatively small, and the name of each corresponding database object is displayed. A large icon mode example 1408 for navigation pane body 1204 is illustrated in FIG. 14D. As is apparent, each icon is relatively large, and the name of each corresponding database object is displayed.

As shown in FIG. 14D for large icon mode example 1408, there are (from left to right) 10 pixels before and 15 pixels after each large icon at each listed entry 1414. Thus, the gutter between the icon and the name remains the same regardless of whether the selected view option is small icon or large icon. However, the item entry 1414 height varies depending on the selected view option in order to accommodate the differently-sized icons.

In a described implementation, small icon view mode 1404 presents the user with (i) a small icon representing the object type and (ii) the name of the object. Large icon view mode 1408 presents the user with (i) a large icon (e.g., 32×32 pixels) representing the object type and (ii) the name of the object listed to the right of the icon, centered vertically against the large icon. The object name wraps in large icon view mode 1408. The number of lines that the name wraps can be specified or unlimited.

The fourth example view mode is the details view mode. The details view mode allows the user to preview the basic metadata for the database object corresponding to the listed entry. In a described implementation, there are four (4) lines displayed per listed entry in body 1204 of navigation pane 210 with details view mode. Moreover, a large icon is also displayed.

After a 10 pixel space, a label containing the object data is centered against the large icon. Data values that include date and/or time can recognize date and/or time formatting as specified for the system. An example for the four displayed lines follows:

First Line:

Object name, left justified and bolded.

Object type, right justified.

In the event that the object name is to long, the object name is clipped leaving room for the object type and a 5 pixel buffer. Ellipses (e.g., " . . . ") are appended to the clipped object name.

Second Line:

Date created: <Created Date\Time/>.

Created dates can have geopolitical sensitivity.

Third Line:

Date modified: <Modified Date\Time/>.

Modified dates can have geopolitical sensitivity.

Fourth Line:

Object description. In the event that the description exceeds the width of the navigation pane, ellipses (e.g., " . . . ") are displayed at the end of the line.

FIGS. 15A, 15B, 15C, and 15D are specific examples of footer section 1206 of navigation pane 210' of FIG. 12. Selection of and/or activation of a feature of footer section 1206 precipitates the presentation of drop down menu 1502 for the navigation pane footer 1206. As illustrated, drop down menu 1502 is actually displayed upwards above navigation pane footer 1206 due to spatial constraints.

Drop down menu 1502 for navigation pane footer 1206 includes, by way of example only, "Group By", "Sort By", and "View By" entries and respective avenues to access submenus thereof; a show all groups command; a navigation options feature; and so forth.

Figure 15A:
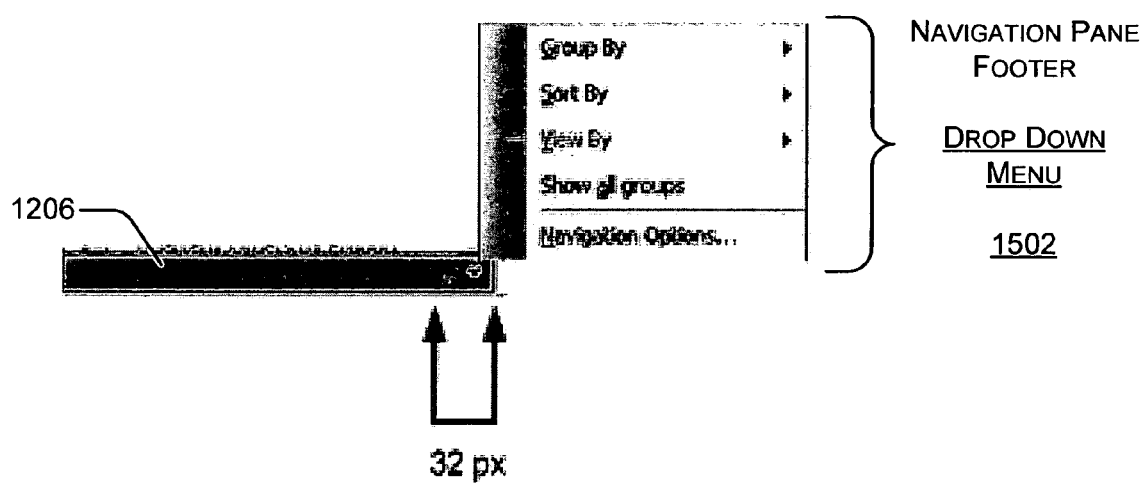
FIGS. 15A, 15B, 15C, and 15D are specific examples of the footer section of the navigation pane of FIG. 12.
Figure 15B:
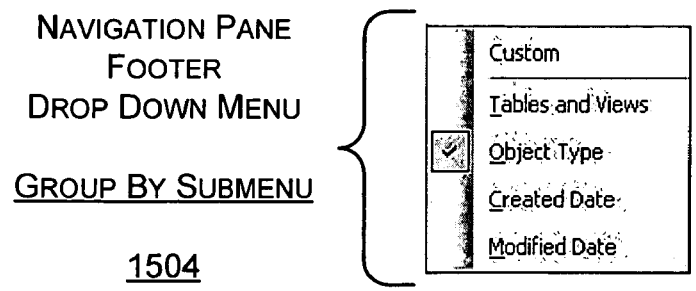

FIG. 15B illustrates a group by submenu 1504 for the navigation pane footer drop down menu 1502. Generally, in group by submenu 1504, user designated or defined (e.g., custom) groupings or group bys are listed first, followed by a separator, which precedes the predefined group bys. A check box is on the currently selected group by. As illustrated, group by submenu 1504 includes, by way of example only, a custom grouping option, a tables and views option, an object type option, a created date option, a modified date option, and so forth.

Figure 15C:
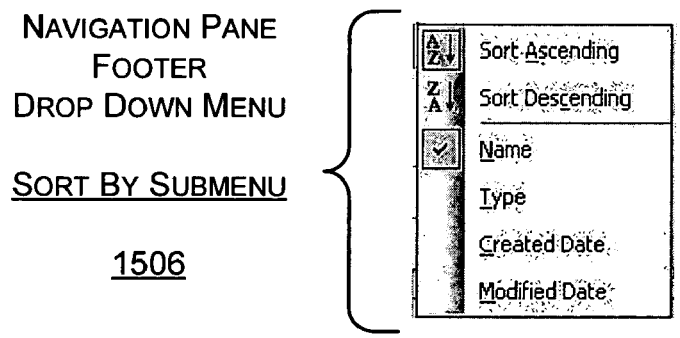

FIG. 15C illustrates a sort by submenu 1506 for the navigation pane footer drop down menu 1502. Generally, sort by submenu 1506 lists the state of the navigation pane sort parameter (e.g., ascending or descending) and the type of sort, with a horizontal line separator between the two. As illustrated, sort by submenu 1506 includes, by way of example only, (i) a sort ascending or sort descending parameter selection option, (ii) a sorting type parameter (e.g., sort by name, object type, created date, modified date, etc.), (iii) and so forth.

Figure 15D:
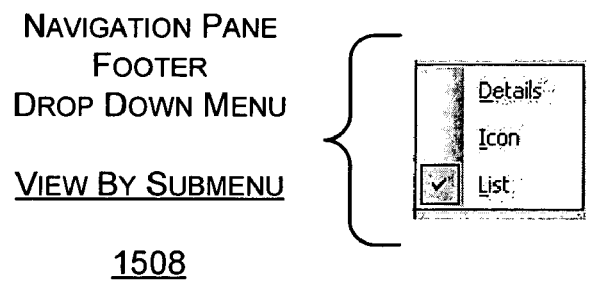

FIG. 15D illustrates a view by submenu 1508 for the navigation pane footer drop down menu 1502. Generally, view by submenu 1508 enables the selection of the database object view mode. As illustrated, view by submenu 1508 includes, by way of example only, a view by details mode option, a view by large icon mode option, a view by small icon or listing mode option, and so forth. Although not so illustrated in FIG. 15D, view by submenu 1508 can also enable access to the above-described view by thumbnail mode.

The devices, actions, aspects, features, screen displays, procedures, modules, components, etc. of FIGS. 1-15D are illustrated in diagrams that are divided into multiple blocks. However, the order, interconnections, interrelationships, layout, etc. in which FIGS. 1-15D are described and/or shown is not intended to be construed as a limitation, and any number of the blocks can be modified, combined, rearranged, augmented, omitted, etc. in any manner to implement one or more systems, methods, devices, procedures, media, apparatuses, arrangements, etc. for database interactions. Furthermore, although the description herein includes references to specific implementations (including a general device of FIG. 16), the illustrated and/or described implementations can be implemented in any suitable hardware, software, firmware, or combination thereof and using any suitable database tech-

Example Operating Environment for Computer or other Device

Figure 16:
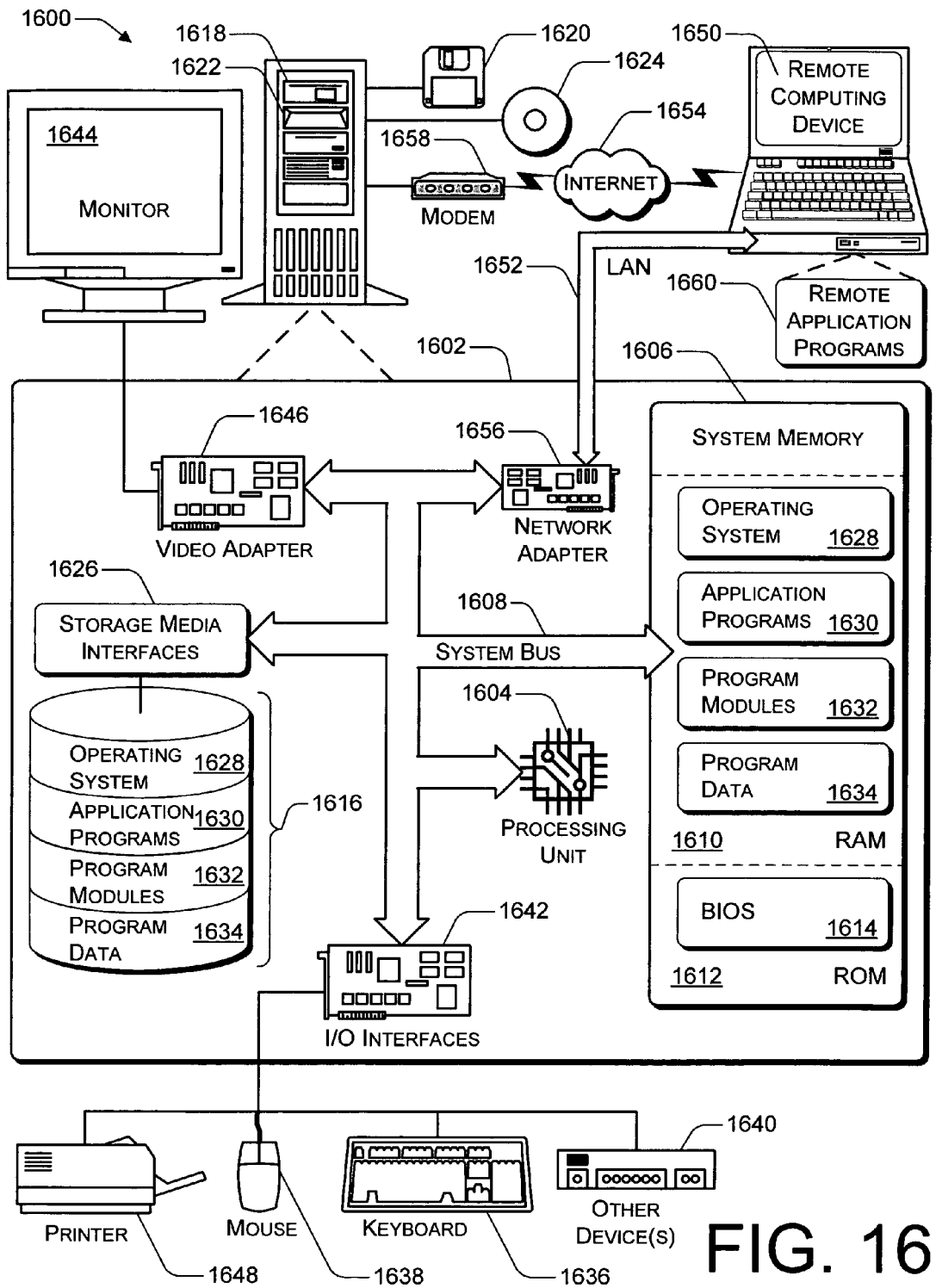
FIG. 16 illustrates an example of a computing (or general device) operating environment that is capable of (wholly or partially) implementing at least one aspect of database interaction as described herein.

FIG. 16 illustrates an example computing (or general device) operating environment 1600 that is capable of (fully or partially) implementing at least one system, device, apparatus, component, arrangement, protocol, approach, method, procedure, media, API, some combination thereof, etc. for database interactions as described herein. Operating environment 1600 may be utilized in the computer and network architectures described below.

Example operating environment 1600 is only one example of an environment and is not intended to suggest any limitation as to the scope of use or functionality of the applicable device (including computer, network node, entertainment device, mobile appliance, general electronic device, etc.) architectures. Neither should operating environment 1600 (or the devices thereof) be interpreted as having any dependency or requirement relating to any one or to any combination of components as illustrated in FIG. 16.

Additionally, implementations for database interactions may be realized with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, videoconferencing equipment, minicomputers, mainframe computers, network nodes, distributed or multi-processing computing environments that include any of the above systems or devices, some combination thereof, and so forth.

Implementations for database interactions may be described in the general context of processor-executable instructions. Generally, processor-executable instructions include routines, programs, protocols, objects, interfaces, components, data structures, etc. that perform and/or enable particular tasks and/or implement particular abstract data types. Database interactions, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Example operating environment 1600 includes a general-purpose computing device in the form of a computer 1602, which may comprise any (e.g., electronic) device with computing/processing capabilities. The components of computer 1602 may include, but are not limited to, one or more processors or processing units 1604, a system memory 1606, and a system bus 1608 that couples various system components including processor 1604 to system memory 1606.

Processors 1604 are not limited by the materials from which they are formed or the processing mechanisms employed therein. For example, processors 1604 may be comprised of semiconductor(s) and/or transistors (e.g., electronic integrated circuits (ICs)). In such a context, processor-executable instructions may be electronically-executable instructions. Alternatively, the mechanisms of or for processors 1604, and thus of or for computer 1602, may include, but are not limited to, quantum computing, optical computing, mechanical computing (e.g., using nanotechnology), and so forth.

System bus 1608 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 1602 typically includes a variety of processor-accessible media. Such media may be any available media that is accessible by computer 1602 or another (e.g., electronic) device, and it includes both volatile and non-volatile media, removable and non-removable media, and storage and transmission media.

System memory 1606 includes processor-accessible storage media in the form of volatile memory, such as random access memory (RAM) 1610, and/or non-volatile memory, such as read only memory (ROM) 1612. A basic input/output system (BIOS) 1614, containing the basic routines that help to transfer information between elements within computer 1602, such as during start-up, is typically stored in ROM 1612. RAM 1610 typically contains data and/or program modules/instructions that are immediately accessible to and/or being presently operated on by processing unit 1604.

Computer 1602 may also include other removable/non-removable and/or volatile/non-volatile storage media. By way of example, FIG. 16 illustrates a hard disk drive or disk drive array 1616 for reading from and writing to a (typically) non-removable, non-volatile magnetic media (not separately shown); a magnetic disk drive 1618 for reading from and writing to a (typically) removable, non-volatile magnetic disk 1620 (e.g., a "floppy disk"); and an optical disk drive 1622 for reading from and/or writing to a (typically) removable, non-volatile optical disk 1624 such as a CD, DVD, or other optical media. Hard disk drive 1616, magnetic disk drive 1618, and optical disk drive 1622 are each connected to system bus 1608 by one or more storage media interfaces 1626. Alternatively, hard disk drive 1616, magnetic disk drive 1618, and optical disk drive 1622 may be connected to system bus 1608 by one or more other separate or combined interfaces (not shown).

The disk drives and their associated processor-accessible media provide non-volatile storage of processor-executable instructions, such as data structures, program modules, and other data for computer 1602. Although example computer 1602 illustrates a hard disk 1616, a removable magnetic disk 1620, and a removable optical disk 1624, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the example operating environment 1600.

Any number of program modules (or other units or sets of processor-executable instructions) may be stored on hard disk 1616, magnetic disk 1620, optical disk 1624, ROM 1612, and/or RAM 1610, including by way of general example, an operating system 1628, one or more application programs 1630, other program modules 1632, and program data 1634. These processor-executable instructions may include, for example, one or more of: a database interaction module, database object(s), a database program or portion thereof, a data structure having an object grouping, a data structure defining a GUI, and so forth.

A user may enter commands and/or information into computer 1602 via input devices such as a keyboard 1636 and a pointing device 1638 (e.g., a "mouse"). Other input devices 1640 (not shown specifically) may include a microphone, joystick, game pad, satellite dish, serial port, video camera, scanner, and/or the like. These and other input devices are connected to processing unit 1604 via input/output interfaces 1642 that are coupled to system bus 1608. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 1644 or other type of display device may also be connected to system bus 1608 via an interface, such as a video adapter 1646. Video adapter 1646 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 1644, other output peripheral devices may include components such as speakers (not shown) and a printer 1648, which may be connected to computer 1602 via input/output interfaces 1642.

Computer 1602 may operate in a networked environment using logical connections to one or more remote computers, such as a remote computing device 1650. By way of example, remote computing device 1650 may be a peripheral device, a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 1650 is illustrated as a portable computer that may include many or all of the elements and features described herein with respect to computer 1602.

Logical connections between computer 1602 and remote computer 1650 are depicted as a local area network (LAN) 1652 and a general wide area network (WAN) 1654. Such networking environments are commonplace in offices, enterprise-wide computer networks, intranets, the Internet, fixed and mobile telephone networks, ad-hoc and infrastructure wireless networks, mesh networks, other wireless networks, gaming networks, some combination thereof, and so forth. Such networks and logical and physical communications connections are additional examples of transmission media.

When implemented in a LAN networking environment, computer 1602 is usually connected to LAN 1652 via a network interface or adapter 1656. When implemented in a WAN networking environment, computer 1602 typically includes a modem 1658 or other component for establishing communications over WAN 1654. Modem 1658, which may be internal or external to computer 1602, may be connected to system bus 1608 via input/output interfaces 1642 or any other appropriate mechanism(s). It is to be appreciated that the illustrated network connections are examples and that other manners for establishing communication link(s) between computers 1602 and 1650 may be employed.

In a networked environment, such as that illustrated with operating environment 1600, program modules or other instructions that are depicted relative to computer 1602, or portions thereof, may be fully or partially stored in a remote media storage device. By way of example, remote application programs 1660 reside on a memory component of remote computer 1650 but may be usable or otherwise accessible via computer 1602. Also, for purposes of illustration, application programs 1630 and other processor-executable instructions such as operating system 1628 are illustrated herein as discrete blocks, but it is recognized that such programs, components, and other instructions reside at various times in different storage components of computing device 1602 (and/or remote computing device 1650) and are executed by processor(s) 1604 of computer 1602 (and/or those of remote computing device 1650).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features of diagrams described. Rather, the specific features and diagrams are disclosed as exemplary forms of implementing the claimed invention.

What is claimed is:

1. One or more processor-accessible storage media comprising processor-executable instructions that include a database interface module, the database interface module configured to group database objects by object dependencies into multiple groups of database objects; wherein the database interface module is configured to display the multiple groups of database objects, each respective group of database objects corresponding to a respective data source object of the database and including at least one data consuming database object that indirectly depends from the respective data source object and excluding data consuming database objects that do not directly or indirectly depend from the respective data source object, wherein direct dependency and indirect dependency is traced via (i) upstream dependencies and (ii) downstream dependencies;

wherein the database interface module is further configured to provide access to the displayed multiple groups of database objects as a navigational capability for the database; wherein the database interface module is further configured to provide access to a particular database object of a displayed particular group of database objects when the particular database object is selected by a user; and wherein the database objects of the displayed particular group of database objects, besides the data source object thereof, comprise dependent database objects that provide a view on or a view of data stored in the data source object of the displayed particular group of database objects;

wherein the database interface module is further configured to display the multiple groups of database objects in a column inside at least a portion of a window, the column including each respective group of database objects having a table as each respective data source object and wherein each respective dependent database object comprises one or more of a query, a report, or a form; and wherein the database interface module is further configured to display an icon adjacent each table displayed in the displayed column, the icon being selectable by a user to: (i) collapse a group of database objects that includes the displayed one or more of a query, a report, or a form that depend from the respective displayed table; and (ii) expand the group of database objects that includes the displayed one or more of a query, a report, or a form that depend from the respective displayed table, wherein the database interface module is further configured to establish a selection hotzone around each database object entry and around a graphical icon adjacent to each database object, wherein the graphical icon indicates the database object type, and wherein placing a pointer icon in the hotzone identifies an associated database object as the current target of the pointer icon, and wherein selection of a hotzone by the pointer icon causes contents of a corresponding database object to be accessed and displayed via a pop-up window or a full window.

2. The one or more processor-accessible storage media as recited in claim 1, wherein the dependent database objects comprise at least one of data processing objects, data formatting objects, or data input objects.

3. The one or more processor-accessible storage media as recited in claim 1, wherein the provided access to the particular database object comprises displaying at least one of (i) one or more details of the particular database object or (ii) at least a portion of the particular database object.

4. The one or more processor-accessible storage media as recited in claim 1, wherein the database interface module is further configured to display the particular group of database objects by presenting the dependent database objects of the particular group of database objects as entries that are proximate to a group header identifying the data source object of the displayed particular group of database objects.

5. A method comprising:
determining object dependencies among database objects of a database in relation to multiple data source objects of the database;
displaying the determined object dependencies as a navigational map; wherein the navigational map comprises multiple respective object dependency groups corresponding to respective ones of the multiple data source objects, a particular object dependency group including a plurality of database objects that depend from a particular data source object; and
enabling access to the displayed database objects of the database in the multiple object dependency groups of the navigational map, including enabling access to the displayed plurality of database objects that depend from the particular data source object of the particular object dependency group;
wherein the database objects of each respective object dependency group, besides the respective data source object thereof, comprise dependent database objects that provide a view on or a view of data stored in the respective data source object of the respective object dependency group;
wherein the displaying comprises:
displaying the multiple object dependency groups in a column inside at least a portion of a window, the column including the particular object dependency group having a table as the displayed particular data source object thereof and one or more of a query, a report, or a form as the displayed plurality of database objects that depend from the displayed particular data source object;
displaying an icon adjacent each table displayed in the displayed column, the icon being selectable by a user to: (i) collapse an object dependency group that includes the displayed one or more of a query, a report, or a form that depend from the respective displayed table; and (ii) expand the object dependency group that includes the displayed one or more of a query, a report, or a form that depend from the respective displayed table; and
establishing a respective selection hotzone around each respective database object of the plurality of database objects and around a graphical icon adjacent to each respective database object of the plurality of database objects, wherein the graphical icon indicates the database object type, wherein placing a pointer icon in the hotzone identifies an associated database object as the current target of the pointer icon,
wherein selection of a hotzone by the pointer causes contents of a corresponding database object to be accessed and displayed via a pop-up window or a full window.

6. The method as recited in claim 5, wherein the plurality of database objects depend both directly and indirectly from the particular data source object; and
wherein the enabling comprises:
enabling access to the displayed plurality of database objects that depend both directly and indirectly from the particular data source object.

7. The method as recited in claim 5, wherein the determining comprises:
determining the object dependencies using a data structure that is maintained to identify object dependencies within the database.

8. The method as recited in claim 5, wherein the determining comprises:
determining the object dependencies for each database object of the database starting with individual ones of the database objects and tracking dependencies upstream toward at least one data source object.

9. The method as recited in claim 5, wherein the determining comprises:
determining at least a portion of the object dependencies by starting with the particular data source object.

10. The method as recited in claim 9, wherein the determining further comprises:
ascertaining those database objects of the plurality of database objects that directly depend from the particular data source object;
ascertaining those database objects of the plurality of database objects that indirectly depend from the particular data source object by tracing downstream dependencies from directly dependent database objects; and
recording those database objects that are ascertained to directly or indirectly depend from the particular data source object in association with the particular data source object for the particular object dependency group.

11. The method as recited in claim 5, wherein the plurality of database objects that depend from the particular data source object include at least one database object that has a second level of dependency with respect to the particular data source object.

12. The method as recited in claim 5, wherein the enabling comprises:

detecting a user selection of a database object from the displayed plurality of database objects; and providing access for the user to the selected database object.

13. A device comprised of at least one processor processor coupled to memory, the device being configured to create a graphical user interface (GUI) to facilitate interaction with a database; the device configured to display a navigational map including a plurality of dependency groups as part of the GUI, each respective dependency group corresponding to a respective data source object of the database and including one or more data consuming database objects that depend from the respective data source object and excluding data consuming database objects that do not directly or indirectly depend from the respective data source object, wherein direct dependency and indirect dependency is trace via (i) upstream dependencies and (ii) downstream dependencies; the device further configured to enable access to one or more database objects of each dependency group of the plurality of dependency groups via the displayed navigational map;

wherein the one or more data consuming database objects that are included as part of each respective dependency group and that depend from the respective data consuming data source object thereof provide a view on or a view of data stored in the respective data consuming data source object of the respective dependency group;

wherein the device is further configured to display the plurality of dependency groups in a column inside at least a portion of a window as a part of the GUI, the column including each respective dependency group having a table as each respective displayed data consuming data source object and one or more of a query, a report, or a form as the displayed data consuming database objects that depend from each respective data source object; and wherein the device is further configured to display an icon adjacent each table displayed in the displayed column, the icon being selectable by a user to: (i) collapse a dependency group that includes the displayed one or more of a query, a report, or a form that depend from the respective displayed table; and (ii) expand the dependency group that includes the displayed one or more of a query, a report, or a form that depend from the respective displayed table.

14. The device as recited in claim 13, wherein the one or more database objects of a respective dependency group comprise view objects that depend directly and/or indirectly from the respective data source object thereof.

15. The device as recited in claim 13, wherein the device is further configured to enable the access to the one or more database objects of each dependency group responsive to user input when a pointer icon is located within one or more respective hotzones established around respective ones of the one or more database objects.

* * * * *